(12) United States Patent
Tang et al.

(10) Patent No.: US 12,422,973 B2
(45) Date of Patent: *Sep. 23, 2025

(54) ESTABLISHED PERSPECTIVE USER INTERFACE AND USER EXPERIENCE FOR VIDEO MEETINGS

(71) Applicant: Microsoft Technology Licensing, LLC, Redmond, WA (US)

(72) Inventors: John C. Tang, Palo Alto, CA (US); William Arthur Stewart Buxton, Toronto (CA); Andrew D. Wilson, Seattle, WA (US); Kori M. Inkpen, Redmond, WA (US); Sasa Junuzovic, Kirkland, WA (US); Abigail J. Sellen, Cambridge (GB); Edward Sean Lloyd Rintel, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,072

(22) Filed: Mar. 17, 2023

(65) Prior Publication Data

US 2023/0236713 A1 Jul. 27, 2023

Related U.S. Application Data

(63) Continuation of application No. 17/480,269, filed on Sep. 21, 2021, now Pat. No. 11,656,747.

(51) Int. Cl.
*G06F 3/04842* (2022.01)
*G06T 7/20* (2017.01)
*G06T 11/00* (2006.01)
*G06V 20/00* (2022.01)
*G06V 20/40* (2022.01)
*H04L 65/4038* (2022.01)

(52) U.S. Cl.
CPC ............ *G06F 3/04842* (2013.01); *G06T 7/20* (2013.01); *G06T 11/00* (2013.01); *G06V 20/00* (2022.01); *G06V 20/40* (2022.01); *H04L 65/4038* (2013.01); *G06T 2200/24* (2013.01); *G06T 2207/30196* (2013.01)

(58) Field of Classification Search
CPC .................................................. G06F 3/0482
USPC .......................................................... 715/753
See application file for complete search history.

(56) References Cited

U.S. PATENT DOCUMENTS 5,627,978 A * 5/1997 Altom ................... H04M 3/567
715/788
6,559,863 B1 * 5/2003 Megiddo .................. H04N 7/15
348/E7.083
9,497,416 B2 * 11/2016 Su .......................... H04N 7/147
(Continued)

*Primary Examiner* — Reza Nabi

(57) ABSTRACT

Aspects of this present disclosure relate to hybrid conference user interface. The hybrid conference interface provides an establishing shot before the meeting begins that places meeting attendees in a specific spatial arrangement, such as in specific seats around a conference table. Upon starting the conference, the hybrid user interface renders an appropriate perspective view of the meeting that is tailored to each attendee's perspective while also being spatially consistent for the entire group of attendees. Allowing attendees to place themselves where they want gives attendees a sense of physical space that helps them stay spatially oriented relative to the other people and resources in the room.

20 Claims, 16 Drawing Sheets

(56) References Cited

U.S. PATENT DOCUMENTS

| | | | |
|---|---|---|---|
| 10,373,381 B2* | 8/2019 | Nuernberger | G06F 3/011 |
| 10,609,332 B1* | 3/2020 | Turbell | H04N 7/152 |
| 10,917,613 B1* | 2/2021 | Chiarella | H04N 7/157 |
| 11,055,891 B1* | 7/2021 | Ofek | G06T 13/40 |
| 2010/0085416 A1* | 4/2010 | Hegde | H04N 7/157 |
| | | | 348/E7.083 |
| 2011/0025819 A1* | 2/2011 | Gorzynski | H04N 7/147 |
| | | | 348/E7.083 |
| 2012/0154513 A1* | 6/2012 | Su | G06F 3/01 |
| | | | 348/E7.083 |
| 2013/0093835 A1* | 4/2013 | Paithankar | H04N 7/152 |
| | | | 348/E7.083 |
| 2014/0063174 A1* | 3/2014 | Junuzovic | G06Q 10/101 |
| | | | 348/E7.083 |
| 2014/0063177 A1* | 3/2014 | Tian | H04N 7/152 |
| | | | 348/E7.083 |
| 2015/0042748 A1* | 2/2015 | Tian | H04N 7/147 |
| | | | 348/14.07 |
| 2015/0244986 A1* | 8/2015 | Su | H04N 7/15 |
| | | | 348/14.07 |
| 2017/0099461 A1* | 4/2017 | Nimri | G06T 7/70 |
| 2018/0067641 A1* | 3/2018 | Lerner | H04L 51/52 |
| 2018/0095635 A1* | 4/2018 | Valdivia | G02B 27/0093 |
| 2018/0095636 A1* | 4/2018 | Valdivia | G06F 3/011 |
| 2018/0158000 A1* | 6/2018 | Fredette | G06Q 30/08 |
| 2019/0287306 A1* | 9/2019 | Wieser | H04N 7/15 |
| 2020/0169825 A1* | 5/2020 | Gong | H04S 7/303 |
| 2020/0344278 A1* | 10/2020 | Mackell | H04N 7/147 |
| 2021/0029327 A1* | 1/2021 | Shaw | H04N 23/695 |
| 2022/0269336 A1* | 8/2022 | Lafontaine | G06F 3/011 |
| 2022/0374197 A1* | 11/2022 | Carrigan | H04S 7/304 |
| 2023/0086906 A1* | 3/2023 | Tang | G06F 3/04842 |
| | | | 715/753 |

* cited by examiner

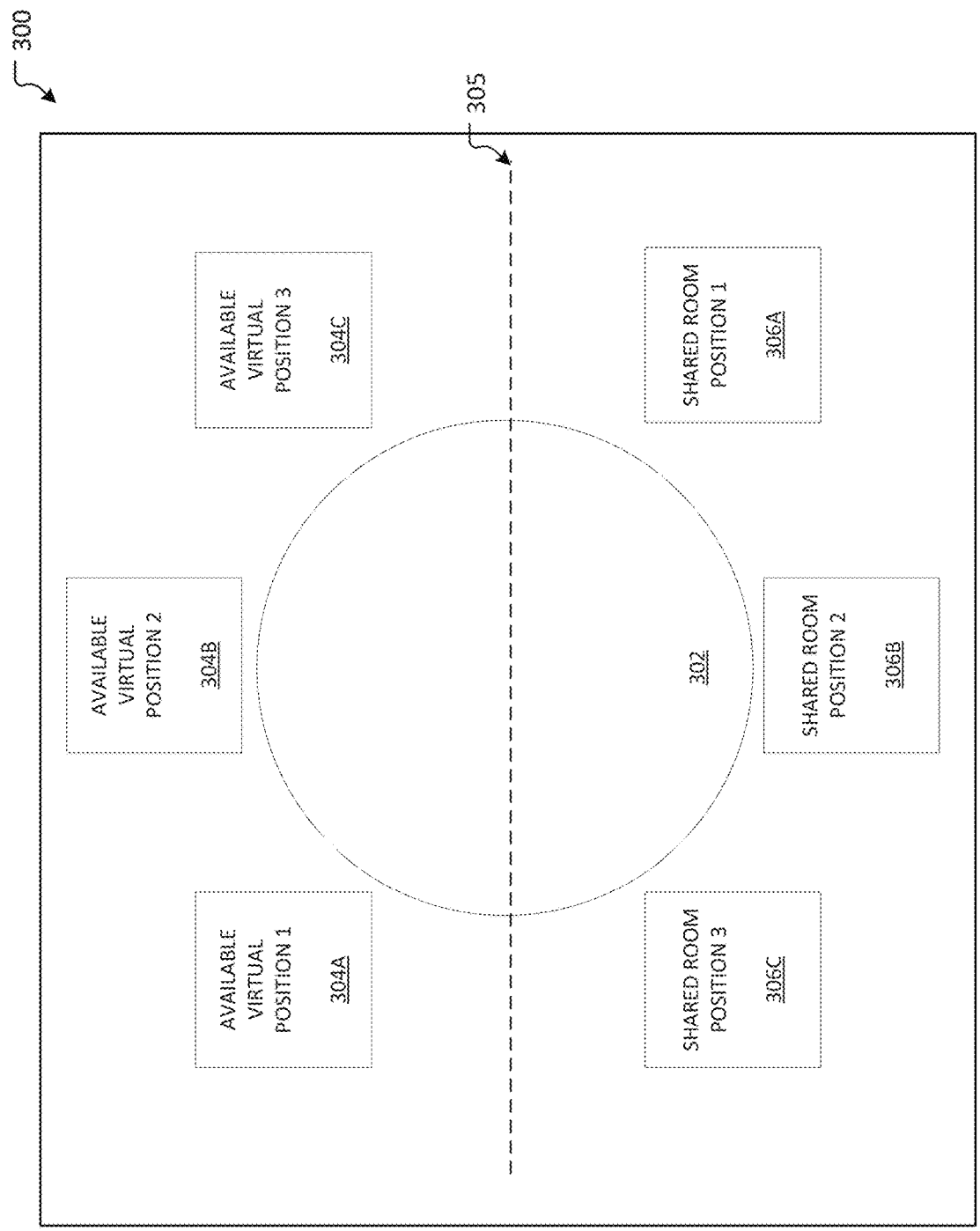

ESTABLISHED PERSPECTIVE USER INTERFACE AND USER EXPERIENCE FOR VIDEO MEETINGS

CROSS-REFERENCE TO RELATED PATENT APPLICATIONS

This application is a continuation of U.S. patent application Ser. No. 17/480,269, filed on Sep. 21, 2021, the disclosure of which is hereby incorporated by reference in its entirety.

BACKGROUND

Creating a user experience for video calls, where some people are meeting together in a room and others are joining remotely, is an ongoing challenge that is becoming more pressing as hybrid work environments become more commonplace due to both internal and external factors and the general increase in the amount companies who allow employees to work from home.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to systems and method for providing a conference user interface. In one example, the user interface may be a hybrid user interface for a hybrid conference. In examples, the hybrid conference user interface provides an establishing shot that shows available positions around a virtual representation of a conference room. As attendees are admitted to the hybrid conference, the available positions are filled with the admitted attendees. When the hybrid conference begins, the hybrid user interface transitions from the establishing shot to a perspective position. In examples, the perspective position is based upon the virtual position for an individual attendee or a group of attendees (e.g., attendees present in a shared physical location). In doing so, the attendees are presented a view of the hybrid conference that maintains the spatial arrangement among the different attendees.

In further examples, if a new attendee joins the hybrid conference after the conference has begun, an establishing shot is presented to the new attendee that depicts the position of the other hybrid conference attendees in their positions around the virtual conference room table. Upon receiving a selection of an available position for the new attendee, the hybrid user interface transitions from the establishing shot to a perspective position for the new attendee.

In still further examples, the systems and methods disclosed herein are operable to track movements of attendees during the hybrid conference. If the movement of an attendee enters into a viewshed of the attendee's perspective, a notification representative of the movement is provided to one or more of the attendees.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 3A depicts an establishing shot user interface of a hybrid conference user interface comprising establishing shot.

DETAILED DESCRIPTION

Figure 1:
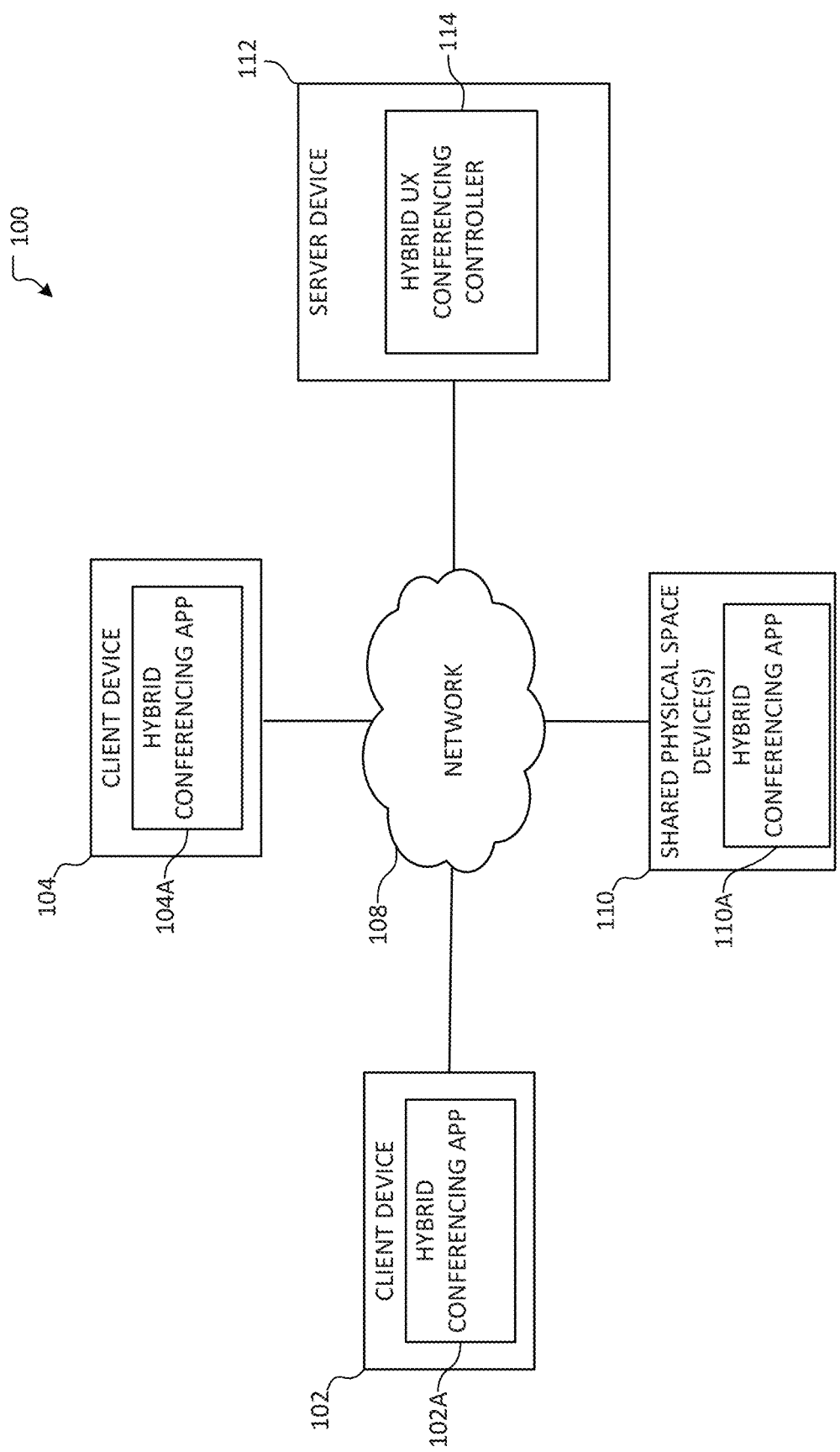
FIG. 1 depicts and exemplary hybrid conferencing system.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

It is a common experience for remote meeting attendees to feel left out when participating in a video conference that includes a group of attendees who are physically present in a meeting space (e.g., in a shared physical space). Often times, the conversation is driven by attendees who are physically located in the shared space as they are better positioned to engage with each other using both verbal communications and non-verbal communication. The designs of existing conferencing solutions, e.g., both video and audio conferencing systems, favor situations in which all attendees are physically remote from each other. Because of the design limitations, users of existing conferencing solutions often find it difficult to feel as if they are participating on equal footing in a meeting with those attendees who are physically located in the same space. For example, due to the placement of microphones in a conference room, remote attendees may have difficulty hearing those who are sitting further away from the microphone. As yet another example, it is often difficult for remote users to see all of the in-person attendees, let alone their facial expressions and non-verbal cues, as a single camera is usually placed at the far end of the conference room. Furthermore, due to world events, such as the COVID-19 pandemic, and the increasing number of employers who allow employees to work remotely, hybrid meetings, that is, meetings where some of the attendees attend in person while others attend remotely are becoming more commonplace.

Creating a User Experience (UX) for hybrid meetings, where some people are meeting together in a room and others are joining remotely (e.g., working remotely from home, located in a different shared physical space such as another conference room, etc.) is an ongoing challenge that's going to become ever more pressing in the hybrid work mode as the world recovers from the COVID-19 pandemic. A problem in particular with hybrid video calls is that the participants in the shared physical space (e.g., a conference room) and the remote participants do not have a shared mental model of the collective spatial arrangement of all the participants. For example, the user experience of existing video call systems do not maintain a consistent visual layout. Instead, they generally move participant windows in order to manage screen space. Thus, people's gestures and eye gazes towards each other, as visible in the video, are not consistent among the group, undermining the sense of being together in a meeting, detracting from productivity of the meeting for all users, and contributing to the fatigue people experience from participating in video meetings.

Aspects of this disclosure address this issue, among others, by providing an establishing shot before the meeting begins that places meeting participants in a specific spatial arrangement, such as in specific seats around a conference table. Defining and declaring the spatial arrangement at the beginning of the meeting provides a number of benefits. For example, the video calling system can render an appropriate perspective view of the meeting that is tailored to each person's perspective while also being spatially consistent for the entire group. Additionally, allowing attendees to place themselves where they want gives people a sense of physical space that helps them stay spatially oriented relative to the other people and resources in the room. Among other benefits, the aspects disclosed herein afford a sense of agency and user control that allows attendees to choose where to be located in the layout of the participants in the meeting. One of skill in the art will appreciate that, among other benefits, aspects of the present disclosure also make it easier to maintain correspondence between contributions to a video meeting and the person contributing, enable more inclusive, equitable participation between people in the room and people participating remotely with those in the room, facilitate natural turn-taking, and reduce cognitive demand (e.g., making it less fatiguing), by leveraging a natural and consistent spatial model of participants and not showing mirrored video preview.

Another benefit of the present disclosure is that the aspects disclosed herein can be employed with existing conference room technology. That is, there is no need for specialized hardware, such as VR or AR headsets, to provide the hybrid user experiences disclosed herein. As such, the aspects disclosed herein are more likely to be adopted by users as users are already familiar with video conferencing systems and do not require users to purchase additional hardware to have a shared video conferencing experience. That said, however, the aspects disclosed herein can also leverage VR and AR headsets as part of the user experience.

As an example, a video conference may place each participant in a circle around a reference object, such as a table. The layout (i.e., a circle in the example) allows the disclosed systems and methods to generate, for each end-point (e.g., meeting room, office at work, office at home, etc.), a view of other participants in a linear arrangement along the bottom horizon of the shared screen that gives the participant(s) at each end-point a unique perspective of the other participants. Each attendee's video may be isolated from their background and placed in a virtual room background that can be selected from a set of virtual room or, for example, that matches the design of the physical conference room. In doing so, each end-point gets the correct view of the other participants, even though each end-point's view will be different from the other endpoints. Moreover, because each view is governed by the initial spatial arrangement defined in the establishing layout when joining the meeting, each attendee should have a consistent spatial model of where everyone else is (even though each person has a different view). At the beginning of the meeting, each attendee may place themselves into a position on the establishing layout which everyone sees in common (e.g., an aerial view of a round conference table with seats surrounding it). This establishing layout serves a similar role as the "establishing shot" in cinema, which gives viewers an overall view of the setting where the ensuing activity (in this case the meeting) will transpire.

Once the meeting starts, the systems and methods disclosed herein may progress to an interface displayed at an end-point through an animation that generates a unique perspective view for each end-point. In examples, the attendees together in the shared physical space count as one end-point, so they only see views of the remote participants. An attendee's video rendering is placed in a common virtual background so it feels like the attendee is looking at a perspective from being in the same shared space with the other attendees. In examples, the background may match what the shared physical space looks like, generating the impression of everyone meeting together in the same shared physical space. However, in other examples, other virtual backgrounds may be used, thereby giving the attendees the feeling that they are in a shared virtual space. The video of each attendee may be placed linearly along the bottom horizon, with a virtual, visual edge of a reference object (e.g., a round conference room table as per the example), which provides a visual grounding foundation for the bottom of each video feed. The arrangement of other attendees' video rendering is consistent with the original spatial arrangement as far as who is on the right edge of an attendee's screen (to the attendee's right), who is on the left edge of the attendee's screen (to the attendee's left) and who is in the center of the attendee's screen (across from the attendee). While the example provided discloses use of a round conference room table as the reference object, the positioning disclosed herein can be adjusted to accommodate other types of reference objects, seating arrangements, physical space objects/characteristics, virtual space objects/characteristics, etc., thereby maintaining a shared spatial perspective based upon the physical characteristics of a physical space shared by the in-person attendees, a virtual space, or a combination of the two.

In further examples, because spatial orientation is maintained among the attendees, aspects of the present disclosure may be further operable to provide spatialized audio. The use of spatialized audio can further reinforce the spatial layout of the participants by adjusting audio output based upon the location of the audio source. That is, having the sound of each participant's voice coming from the appropriate location (as established in the establishing shot) provides an ongoing way to convey the spatial layout of the participants throughout the meeting. In certain aspects, the aspects disclosed herein leverage the spatial positioning of attendees to adjust the audio originating from the individual attendees based upon the originating attendee's positional location. That is, the audio feed from different attendees can be individually altered to mimic sound waves such that the individual audio feeds sound like they originate from their associated attendee's position in a three dimensional space relative to the attendee receiving the audio feed. This adjustment may be individually performed for each attendee (or groups of attendees in a shared space) to provide each attendee with spatially correct audio. In doing so, the aspects of the disclosure can provide both a more immersive user interface, as the visuals and audio work together to create a strong sense of a consistent spatial orientation, in addition to accessibility for attendees with visual impairments who may be unable to see the visual layout.

In further examples, shared screen content appears above the line of people's video arrangement, e.g., conceptually centered on the reference object, but above attendee's heads. This placement allows all attendees to see the shared content without being limited to a virtual placement in the room (e.g., an attendee does not have to reposition their location in the room to get a clear view of the shared content). Attendees may not need to be presented a preview of themselves in order to maintain the sense of shared space. Allowing an attendee to avoid monitoring the video preview of themselves in video meetings may alleviate some of the fatigue reported around video calls. Further, in examples, none of the attendees' video feed is mirrored. Thus, gestures toward people on the right and left and across make sense and are consistent for all attendees. In doing so, the systems and methods disclosed herein ensure that this is true about gestures directed among people together in the physical conference room, which appear correctly to all other attendees as well. These kinds of gestures can be crucial in referring to people or objects in the collaboration, as well as facilitating turn-taking.

In certain aspects, the attendees physically located in the shared physical space may be isolated into separate video renderings (which could be done by having an individual camera on each person, or isolated from a panorama view by background removal and segmenting into views of each individual). This approach allows for placing each attendee who is in the shared physical space in the appropriate location of the rendered virtual space for the remote participants to see. When attendees in the physical shared space turn and gesture physically towards the others in the physical space, the virtual conference room layout preserves the relative spatial direction of those gestures, which is presented properly to the remote attendees.

In doing so, aspects of the present disclosure create a mental illusion of meeting together in the same space among a hybrid arrangement where some attendees are physically in the same space (e.g., in a conference room together) and other attendees are joining remotely, (e.g., individually or in a different shared physical space). Attendees can join the meeting late, after it was started, but still go through the establishing layout stage to pick their position in the virtual conference room. While aspects of the present disclosure are described with respect to displaying a shared virtual space in a video conferencing application, one of skill in the art will appreciate that the aspects disclosed herein can also be practiced in a virtual reality or augmented reality environment. For example, immersion can be further enhanced by positioning the attendees in a VR environment using virtual reality hardware.

While aspects disclosed herein are describe with respect to a hybrid conference, i.e., a conference with remote and in-person attendees, one of skill in the art will appreciate that the aspects disclosed herein can be practiced with traditional video conferences in which all attendees are remote. That is, an establishing shot can still be provided which sets up a spatial relationship among the remote attendees. Further, the remote attendees may be provided with individual perspective views which maintain the spatial relationship among the attendees as provided in the establishing shot. As such, the disclosed aspects are not limited to hybrid conferences, rather, they can be employed with traditional video or phone conferences (e.g., using spatial audio) as well.

In further aspects, the spatial arrangement layout can reflect different meeting styles, work cultures, status levels, etc., so attendees know when they join the conference what kind of meeting they are joining and their role in the meeting. For example, a meeting with a CEO may have a special spot reserved for the CEO, or a meeting that involves a strict sense of hierarchy, such as in the military or a courtroom setting, would have an arrangement layout that reflects that hierarchy, or a meeting in a Japanese work context may have a layout arrangement that reflects the appropriate cultural norms. In such aspects, upon creation of the conference, the type of meeting style may be defined. In doing so, the hybrid conferencing systems disclosed herein may load a defined spatial template that establishes a specific spatial arrangement. The spatial template may limit attendees to selection of one or more specific positions based upon the attendees' roles in the meeting, location in the hierarchy, etc. In certain aspects, the hybrid conferencing system may automatically position an attendee based upon their role, (e.g., position the CEO at the head of the virtual table, place a judge at a virtual podium, etc.). Alternatively, given the defined spatial template, attendees can use social protocols to arrange themselves in an acceptable manner (even if it means co-opting the spatial template).

FIG. 1 depicts an exemplary hybrid conferencing system 100. System 100 includes remote client devices, i.e., client device 102 and client device 104, which may be used by remote attendees. Although remote client devices 102 and 104 are depicted as a single device in FIG. 1, a remote attendee may use multiple devices when attending a conference (e.g., a television for display, a computing device to connect to the conference, a phone for audio, etc.) System 100 further includes one or more physical space devices 110. As an example, the physical space devices 110 may be located in a shared physical space, such as a conference room, a court room, etc., in which one or more attendees may be meeting in-person. Client devices 102, 104, and physical space devices 110, may communicate with each other and a server device 112, via a network 108. Network 108, may comprise a local area network, a wireless network, the Internet, or any combination thereof, among other examples. In aspects, client device 102, client device, 104, and one or more physical space devices 110 may comprise hybrid conferencing applications 102A, 104A, and 110A, respectively. Hybrid conferencing applications 102A, 104A, and 110A may be a client-side conferencing application operable to connect the devices to the hybrid conference, display a hybrid conference user interface, and or communicate data between the devices participating in the hybrid conference. In one example, the individual hybrid conferencing applications may be executed on the client and/or conferencing room devices. Alternatively, or additionally, the hybrid conferencing applications may be application instances hosted by, for example, the server device 112 or a cloud service platform (not shown).

In examples, client devices 104, 106 may be a personal computer (connected to a display, microphone, and/or camera), a smartphone, a tablet computing device, a laptop, a smart speaker, a camera, or a combination of devices. One of skill in the art will appreciate that any type of device capable to connect to a hybrid conference, transmit data from the client device to one or more other devices associated with the hybrid conference, and/or present audio and/or video associated with the hybrid conference may be employed with the system 100. Physical space device(s) 102 may include, but are not limited to, a personal computer (connected to a display, microphone, and/or camera), a smartphone, a tablet computing device, a television, a display monitor, a smart speaker, a video camera, etc. Server device 112 comprises a hybrid user experience conferencing controller 114. The hybrid user experience conferencing controller 114, also referred to herein as the conferencing controller 114, may be operable to control the individual hybrid conference experience presented to attendees accessing the hybrid conference via client device 102, client device 104, and physical space devices 110. In example, the hybrid conferencing controller 114 may be operable to establish and control the hybrid conference for the hybrid conference attendees. For example, when a hybrid conference is initiated, the hybrid conferencing controller may be operable to load a style template for the hybrid conference. In one example, the style template may be selected based upon the physical layout of the shared physical space in which the in-person attendees will attend the conference. For example, the hybrid conferencing controller 114 may select and/or load a style template associated with a conference room assigned to the hybrid conference, that is, the virtual representation of the hybrid conference may be defined by the physical characteristics of the assigned conference room. For example, the shape and position of the conference room table, the location of seats around the conference room table, the view of the conference room (based, for example, on the position of a camera in the conference room), etc., may be used to define the style template. In examples, a predefined style template associated with the conference room may be associated with the physical conference room. Alternatively, or additionally, the hybrid conferencing controller 114 may dynamically generate the style template at the time of the conference. For example, the hybrid conferencing controller 114 may dynamically generate a template at the time of the conference based upon video feed of the conference room at the time of the conference. For example, the hybrid conferencing controller 114 may use image recognition tools to identify characteristics of the conference room (e.g., table size/shape/location, seat locations, wall color, artwork, etc.) from a live video feed of the conference room. While a conference room is provided as an example of a shared physical space in FIG. 1 and throughout the disclosure, one of skill in the art will appreciate that the shared physical space can be any type of physical space, such as an auditorium, a court room, an event center, a restaurant, etc.

Figure 3B:
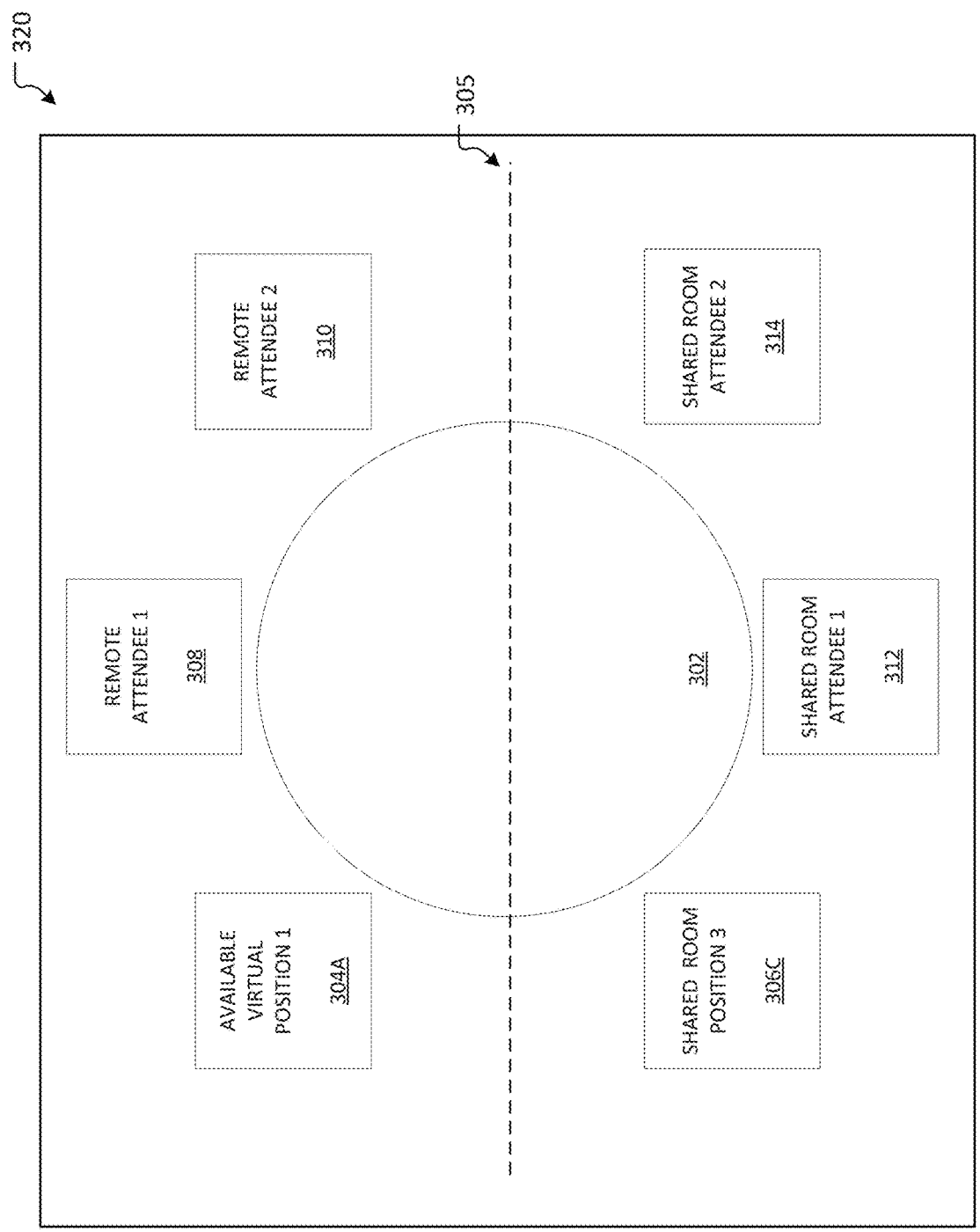
FIG. 3B depicts updated view of an exemplary establishing shot user interface of a hybrid conference user interface as hybrid conference attendees are added to the conference.

Upon selecting the style template, the conferencing controller may send or otherwise present the style template to the attendee devices (e.g., client device 102, client device 104, and/or one or more physical space devices 110). The attendee devices may present an establishing shot, such as the establishing shot user interface 300 depicted in FIG. 3A (discussed in more detail below), to the attendees. In examples, the hybrid conferencing application (e.g., hybrid conferencing applications 102A, 104A, and 110A) are operable to receive a selection of a shared room position for an attendee. For example, a remote attendee accessing the conference room via client device 102 may select a position around the virtual conference table. In an example, the hybrid conferencing application 102A, may restrict selection to specific positions for remote attendees (i.e., hybrid conference attendees not in the physical conference room), such as Available Virtual Position 304A, Available Virtual Position 304B, or Available Virtual Position 304C, shown in FIG. 3A. Continuing the example, upon receiving a selection of the attendee's position, the hybrid conferencing application 102A transmits the selected position to server device 112 and/or client device 104 and conferencing room devices 110. Transmission of the selected position causes the establishing shot depicted on the attendees' devices to display an updated user interface depicting an establishing shot showing the position occupied by the attendee. For example, FIG. 3B shows an updated view of FIG. 3A in which available virtual position 2 304B (FIG. 3A), is updated to show the spot occupied by remote attendee 1 308 (FIG. 3B). In the example, the hybrid conferencing application 102A may transmit information about the remote attendee, such as the remote attendee's name, a camera feed of the remote attendee, or other information that may be displayed in the updated establishing shot. In examples, once the attendee has selected their position, the attendee may be able to interact with other attendees present in the establishing shot.

In certain aspects, rather than requiring the in-person attendees to select their positions, hybrid conferencing controller 114, may dynamically update the establishing shot as the in-person attendees take their individual seats around the reference object (e.g., a conference room table in the provided examples). In said example, the conferencing controller 114 may analyze a live video feed of the shared physical space and update the establishing shot showing the positions occupied by the in-person attendees. In some instances, when given permission, the hybrid conferencing controller may automatically determine information about the seated in-person attendee, for example, using facial recognition software, receiving information about the attendee via the attendees ID card (e.g., via RFID), and update the establishing shot with additional information about the in-person attendee. Continuing the example with respect to FIGS. 3A and 3B, the hybrid conferencing system may dynamically update shared room position 1 306A and shared room position 2 306B (shown in FIG. 3A) to identify in-person shared room attendee 1 312 and in-person shared room attendee 2 314 (FIG. 3B), as the in-person shared room attendees sit in those positions in the conference room. Aspects of the present disclosure may further be operable to allow attendees to join without picking a specific seat. For example, an attendee may have the option to join as a "standing room" attendee. A "standing room" attendee does not select a position in the conference room but will still be able to communicate with the other attendees in the conference. This allows attendees to join when they may not be in a position to select a position (e.g., calling in from an airport or while driving). Further, the allowance of such "standing room" attendees to join the conference may allow the hybrid conferencing system to be backwards compatible with older conference systems or to interact with systems that do not support the hybrid conference functionality.

Figure 3C:
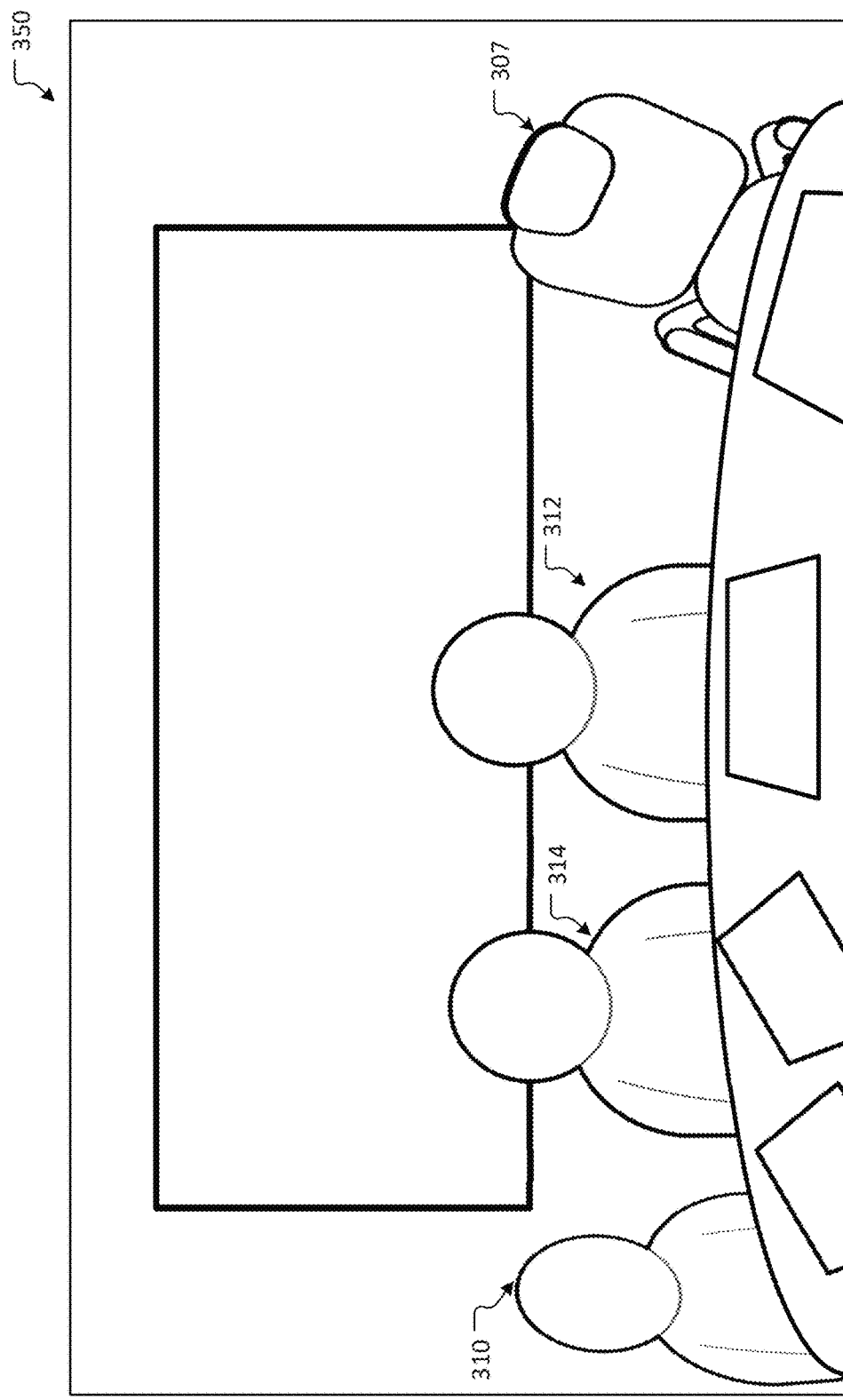
FIG. 3C depicts a perspective view of a hybrid conference user interface for a remote attendee.

Once the one or more remote attendees and one or more in-person attendees have selected their respective virtual positions or taken their corresponding physical seat, the hybrid conference controller 114 may allow the seated attendees to communicate with each other. During this initial communication stage, the hybrid conference controller 114 may maintain the establishing shot. Upon indication that the conference has started, for example, upon reaching the set conference time or receiving an indication to start the conference (e.g., from one of the attendee client devices and/or conferencing devices), the hybrid conferencing controller may send an instruction to the hybrid conferencing applications 102A, 104A, and 110A, to begin the hybrid conference. Upon receiving the instruction to begin the hybrid conference, for example, hybrid conferencing application 102A, may display a transition from the establishing shot (e.g., establishing shot user interfaces 300 shown in FIGS. 3A and 3B), to the hybrid conferencing attendees' view. For example, the view from remote attendee 1 308 (of FIG. 3B) will transition to remote attendee 1 view 350 (FIG. 3C). As shown in remote attendee 1 view 350, the remote attendee 1's view will correctly show shared room attendee 1 312 position across the virtual table, remote attendee 2 310 to the left of remote attendee 1, and shared room attendee 2 314 across the table to the left between remote attendee 2 310 and shared room attendee 1 312. In doing so, remote attendee 1 308 will have a correct perspective view of the other attendees as if remote attendee 1 308 was physically seated at the conference room table. This view enhances remote attendee 1's 308 immersion in the conference, making it feel as if the remote attendee was present in the conference room with the shared room attendee 1 312, remote attendee 2 310, and shared room attendee 2 314, thereby enhancing the experience of remote attendee 1 312 and making it easier for remote attendee 1 312 to participate in the conference even though the attendee is not physically located in the room with the other attendees. In certain examples, unfilled seats may show up as empty in view 350. In alternate examples, a graphical indicator of an available space may be displayed, as depicted by avatar 307 (which corresponds to available position 304A of FIG. 3B). In certain aspects continuing with the above example, remote attendee 1 308 may be able to select the available position during the conference to change their seated position. In doing so, the view 350 may be adjusted accordingly to accurately represent the position of the other attendees from the newly selected position. In aspects where spatial audio is used, the hybrid conferencing system will be able to adjust the audio input received from the different attendees to simulate audio from the different attendees as originating from their new positions relative to remote attendee 1 308.

Figure 3D:
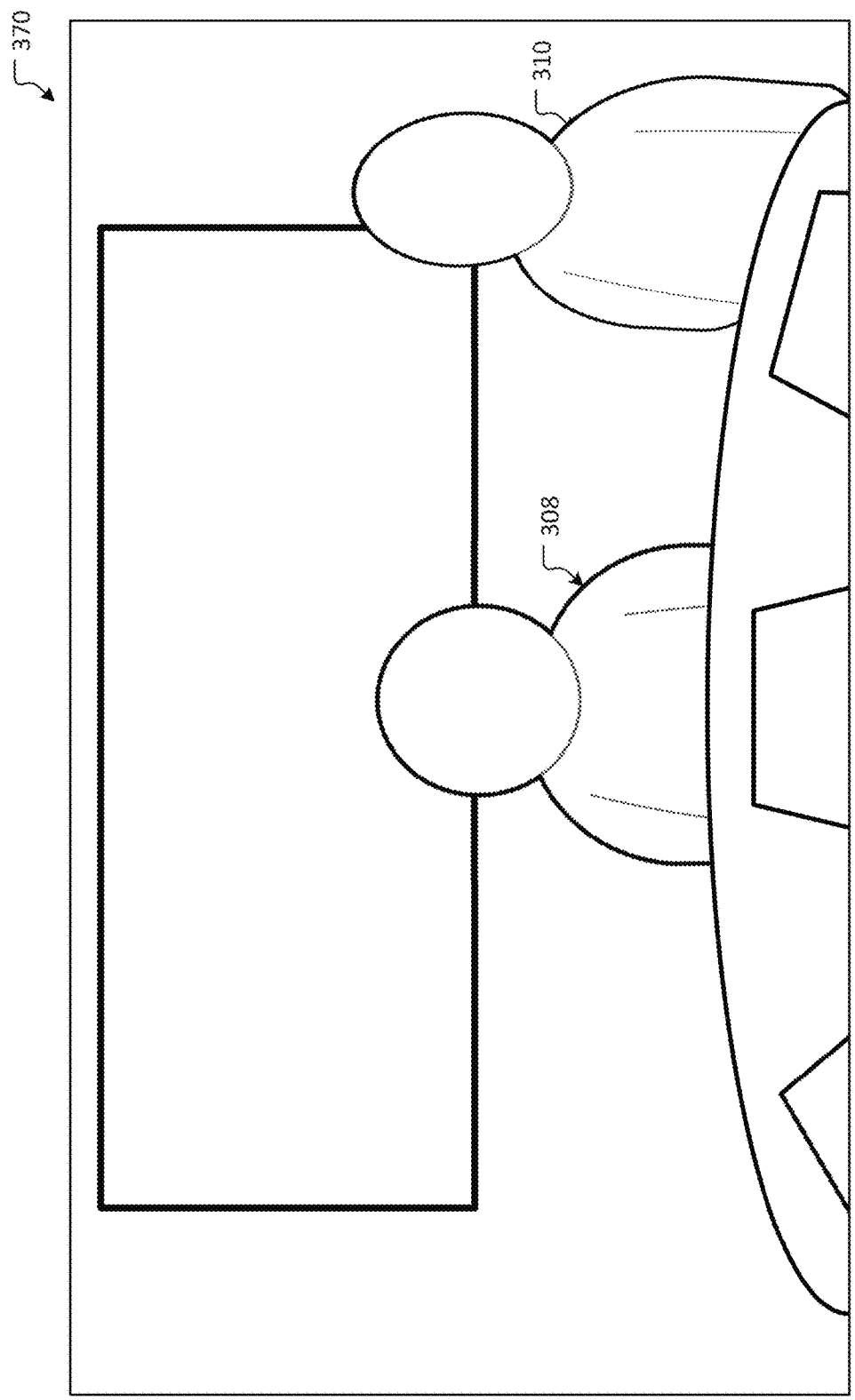
FIG. 3D depicts a perspective view of a hybrid conference user interface for in-person attendees.

The hybrid conferencing system 100 causes each device participating in the hybrid conference to transition to a unique view and/or spatial audio based upon the position of the attendee associated with the device. For example, as discussed above, FIG. 3C depicts a perspective view 350 for remote attendee 1 308 (FIG. 3B), FIG. 3D depicts a correct perspective view for the shared room attendees sitting in shared room of remote attendee 1 308 and remote attendee 2 310 (FIG. 3B). Although not shown, remote attendee 2 310 would have her own unique perspective view. Although system 100 and the user interfaces depicted in FIGS. 3A-3F depict a set number of attendees (e.g., two remote attendees on two client devices 102 and 104 and two in-person attendees associated with the shared physical space devices 110), one of skill in the art will appreciate that the aspects disclosed herein can include additional (or fewer) client devices, remote attendees, and in-person attendees, or even people in another shared space (another meeting room).

Figure 2:
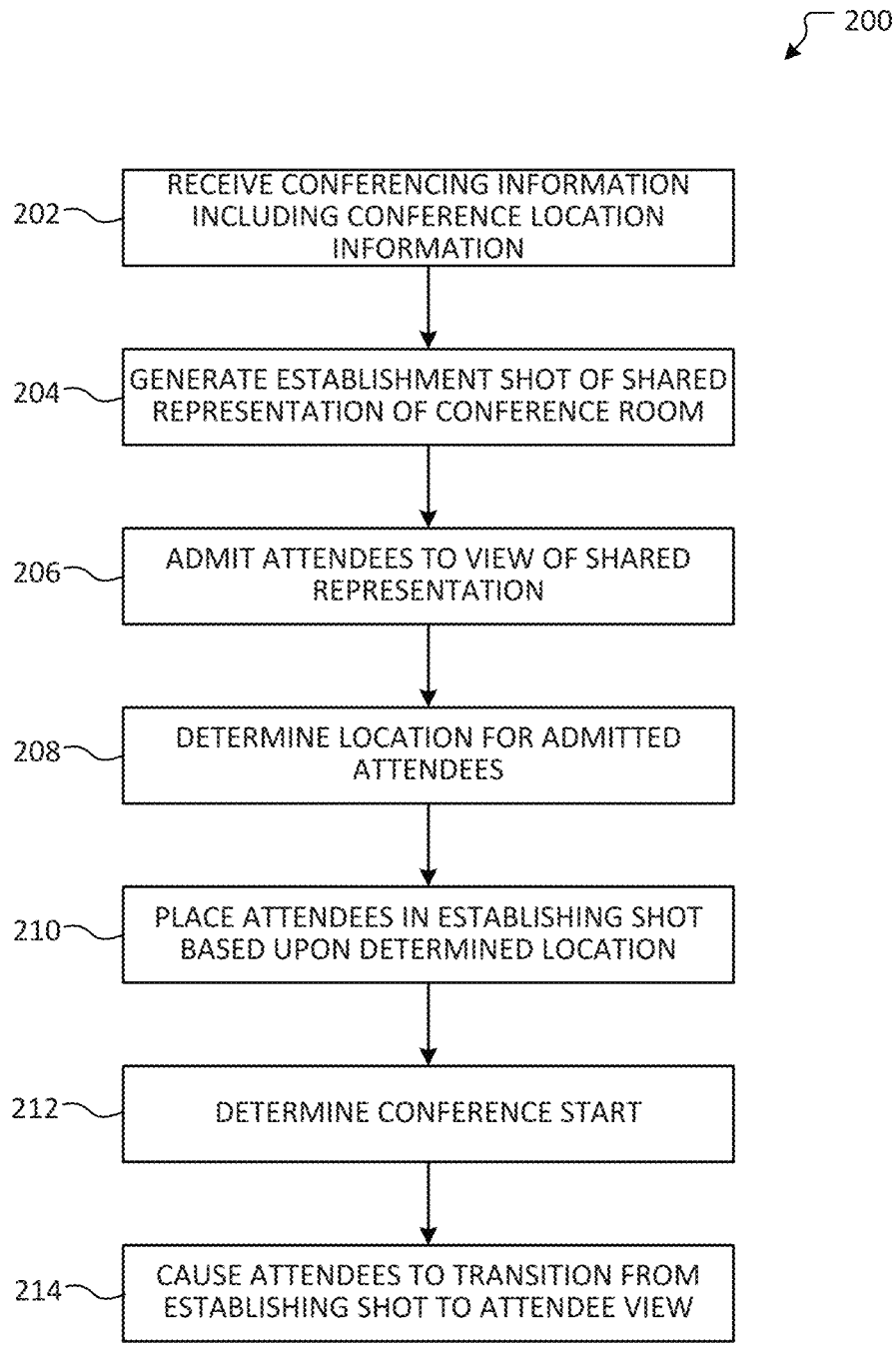
FIG. 2 depicts an exemplary method for establishing a hybrid conference.

FIG. 2 depicts an exemplary method 200 for establishing a hybrid conference. The method 200 may include more or fewer steps or may arrange the order of the steps differently than those shown in FIG. 2. The method 200 can be executed as a set of computer-executable instructions executed by a computer system and encoded or stored on a computer readable medium. Further, the method 200 can be performed by gates or circuits associated with a processor, an ASIC, an FPGA, a SOC or other hardware device. In one example, the method 200 may be performed by a hybrid conference controller, such as hybrid conference controller 114 of FIG. 1. The method 200 may be performed by one of the attendee devices, a host device, or a cloud service platform. While FIG. 2 is described with respect to a hybrid conference, that is, a conference that includes both remote attendees in-person attendees, one of skill in the art will appreciate that the aspects disclosed herein can be employed in a conference setting in which all attendees may be remote. As such, the aspect disclosed herein can be practice with video conferences that include all remote attendees or a mix of remote and in-person attendees.

The method 200 begins at operation 202 where conferencing information is received. In one aspect, the conferencing information may be received as part of a meeting invite for a conference. For example, when a user sends an invite to a conference call, such as a video conference using a conferencing application, the invite may be received by the device performing the method 200. Information about the conference, such as the time the conference begins, the shared room associated with the conference (e.g., a conference room, a court house, and the like), the attendees, etc., may be determined based upon the invite. Alternatively, or additionally, a user interface may be provided which allows a user to set up a conference. The user interface may be operable to receive information about the conference and use the information to generate invites which are sent to the attendees. Of relevance, the conference information includes location information. In an example, the location information identifies a conference room in which in-person attendees will attend the meeting. Alternatively, the location information may define a virtual space for the conference. In further aspects, the conferencing information may also include additional information which may define the meeting style, format, and/or type of the conference or meeting. For example, if the conference is a court proceeding, the method 200 may use that information to determine a location or a style for the conference. This information may be used to determine or select a style template for the meeting. In still further aspects, meeting style, format, or type of the conference or meeting may be determined based upon the attendee list. For example, if a manager or CEO is invited to the meeting, the method 200 may determine a meeting style appropriate for the attendees based upon the attendee list. In such aspects, the method 200 may analyze the attendee list and information related to the individual attendees to determine their roles, the type of meeting, or other relevant factors in order to determine a meeting style.

At the start of the conference, flow continues to operation 204 where an establishing shot is generated for the conference. In examples, the establishing shot is a shared view of the conference room that allows the various attendees to establish a shared understanding of the virtual meeting space. In one example, the establishing shot may be selected from a style template associated with a conference room assigned to the meeting. The style template may be a virtual representation of the physical conference room in which the in-person attendees will gather. The selected style template may be previously determined and associated with each conference room associated with the hybrid conferencing system. Alternatively, the style template may be automatically generated at the start of the meeting. Automatic generation of the style template may comprise receiving a live camera view of the physical conference room. The device performing the method 200 may analyze the camera view, for example, using image recognition tools, to generate a template that corresponds to the current view of the conference room. In such an example, the hybrid conferencing system may analyze image data from the camera view to identify objects in the shared physical space. For example, one or more machine learning models may be used to identify objects in the shared physical space. A digital representation of the identified objects may then be generated, for example, by accessing a pre-built object library or by rendering a digital representation based upon object characteristics determined using the machine learning model (s). The digital representations of the object may be included in the style template and rendered during the hybrid conference.

In still further aspects, the establishing shot may be based upon a virtual meeting space. For example, rather than selecting a physical shared space, a virtual space may be selected which will allow all attendees to join the conference in a virtual space. A virtual meeting space may be employed with a virtual reality system or a video conferencing system. In one example, generating the establishing shot may be performed by a hybrid conferencing application, such as hybrid conferencing application 114. Alternatively, a hybrid conferencing application may instruct the individual conferencing applications executed or accessed by client devices and or physical space devices to load an establishing shot of the conference room at the start of the conference.

Flow continues to operation 206, where, upon displaying, or causing display, of the establishing shot, the attendees are admitted to the hybrid conference. In examples, admitting the attendees to the hybrid comprises providing a user interface of the hybrid conference in which each attendee can view the establishing shot of the virtual conference. For example, referring to FIG. 3A, an exemplary user interface of an establishing shot user interface 300 comprising establishing shot is presented. In examples, the establishing shot user interface 300 includes a graphical indicator 305, shown by the depicted line, demarking which positions are available to the different types of attendees. For example, positions located above graphical indicator 305 in the establishing shot user interface 300 may be reserved for remote attendees, while positions below graphical indicator 305 are reserved for in-person attendees. In one example, the reservation of positions for in-person or remote attendees may be defined by the style template for the conference room. For example, if there is only a single camera available in the conference room, the positions reserved for in-person attendees may be located opposite the camera in the conference room. Alternatively, when there are no limitations due to camera positions in the conference room, there may be no need to reserve positions specifically for in-person vs. remote attendees. In such instances, all positions may be selectable on a first come, first serve basis.

While not shown in FIG. 3A, the graphical indicator 305 demarking which seat is available to an attendee may comprise transparent, greyed out, or any other graphical indications that a position is unavailable or otherwise not selectable for a particular user. For example, the establishing shot user interface for a remote attendee may display available virtual position 1 304A, available virtual position 2 304B, and/or available virtual position 3 304C in a manner that graphically distinguishes these positions from shared room position 1 306A, shared room position 2 306B, and shared room position 3 306C around a reference object 302. In examples, the reference object 302 may be a conference room table, however, other types of reference objects may be employed with the aspects disclosed herein. Shared room position 1 306A, shared room position 2 306B, and shared room position 3 306C may be transparently displayed, crossed out, or otherwise displayed in a manner that indicates they are not selectable in the establishing shot user interface 300 for a remote attendee. In further examples, only available positions may be displayed to a user based upon whether they are an in-person or remote attendee. For example, the establishing shot user interface 300 user interface for a remote attendee may only show available virtual position 1 304A, available virtual position 2 304B, and/or available virtual position 1 304C, while omitting display of shared room position 1 306A, shared room position 2 306B, and shared room position 3 306C as these positions are not available to a remote attendee.

Referring back to FIG. 2, upon admitting users to the hybrid conference, flow continues to operation 208 where the location for the admitted attendees is determined. In one example, a location for a remote attendee may be determined based upon receiving a selection of an available position from a device associated with a remote attendee. For example, referring again to FIG. 3A, a selection of a user interface element associated with available virtual position 1 304A, available virtual position 2 304B, or available virtual position 1 304C may be received at the establishing shot user interface 300 user interface displayed to a remote attendee. Furthermore, as described above, the in-person positions may be automatically detected by the device performing the method 200 as the in-person attendees take seats around the conference room. For example, image detection tools may be employed to analyze the camera feed of the conference room and determine when an in-person attendee sits in a position. The image detection tool may be a machine learning model trained to identify available spaces (e.g., open seats) and track the motion of a person to determine when a person has settled in an available position. Alternatively, other devices may be employed to determine when an in-person attendee has taken a specific position. For example, a weight sensor in a chair can be used to determine when an attendee sits in a chair.

As the position of the hybrid conference attendees are determined, flow continues to operation 210 where the attendees are placed in their determined position in the establishing shot. Referring now to FIG. 3B, and updated view of the user interface for the establishing shot user interface 300 comprising an establishing shot is shown. As remote attendees select their seats, and in-person attendees sit in conference room chairs, the establishing shot user interface (shown in FIG. 3A) is updated to indicate that the position is occupied. For example, as shown in FIG. 3B, remote attendee 1 308 is depicted as placed in available virtual position 304B (FIG. 3A) while remote attendee 2 310 is depicted as placed in available virtual position 304C (FIG. 3A). The establishing shot user interface 300 may be dynamically updated in response to selection of the available positions by the remote attendees. Similarly, as in-person attendees sit in the conference room, establishing shot user interface 300 may be updated to indicate that the shared room position is occupied. For example, as shown in FIG. 3B, shared room attendee 1 312 and shared room attendee 2 314 are shown occupying shared room position 2 306B (FIG. 3A) and shared room position 1 306A (FIG. 3A), respectively. Although the establishing shot user interface 300 depicted in FIG. 3B shows a top-down view of the hybrid conference space, other views, such as an angular view, may be employed with the systems and methods disclosed herein. The establishing shot may be any type of static or dynamic view which allows the conference participants to understand their spatial relationship to the other participants.

In certain aspects, once an attendee is admitted, information about the attendee, such as the attendee's name, title, location, etc. may be shown, for example, at the attendee's position in the establishing shot user interface 300. In other aspects, a camera feed of the admitted attendee may be displayed at the selected position. In still further example, the audio received from the attendee may be spatialized, that is, the audio may be adjusted to sound like it originated from the location of the speaking attendee relative to the attendee receiving the audio. Admitted attendees may be able to converse with each other, via video or voice, upon admittance to the conference.

Referring back to FIG. 2, flow continues to operation 212, where a determination is made that the hybrid conference has begun. In one example, the determination may be based upon receiving an indication to start the conference from one of the attendees. For example, an attendee might click a button (not shown) in the establishing shot user interface 300 that initiates the conference. Alternatively, the determination to begin the conference may be determined based upon reaching a start time of the conference, upon admittance of a specific attendee, upon admittance of all attendees or a threshold number of attendees, etc. Similarly, the establishing shot user interface 300 may be used to admit new attendees as they join the conference. Upon determining that the hybrid conference has started, flow continues to operation 214.

At operation 214, the conference is initiated. Initiation of the conference causes he view to transition from the establishing shot to an attendee view for the individual attendees or group of attendees in a shared physical space. As previously discussed, the establishing shot shown in the establishing shot user interface establishes a shared sense of space for all attendees of the hybrid conference, regardless of whether an individual attendee is physically located in the conference room or is remotely attending. At operation 214, each device depicting the establishing shot user interface 300 user interface transitions from the establishing shot user interface to a perspective view based upon the position of the attendee associated with the device. The transition may comprise seamlessly moving or animating the view from the establishing shot to a first person provisional view. The movement of the view helps to further establish a sense of space for each individual attendee based upon their position in the conference room. Alternatively, each client side application (e.g., hybrid conferencing apps 102A, 104A, and 110A of FIG. 1) may cause the transition to the attendee's perspective view. In one example, an instruction may be sent from the device performing the method 200 which causes each device participating the hybrid conference to initiate the transition from the established view to the device attendee's position. In one example, the transition may be synchronously performed by all devices, thereby giving each attendee the experience of "sitting" at their individual place at the around the reference object at the same time. Alternatively, the transitions may not synchronously happen. For example, the transition may occur for an individual attendee upon the attendee initiating the transition. However, in such a scenario, an attendee may not be allowed to initiate the transition until the meeting starts, thereby ensuring that each attendee sees the same establishing shot depicting the position of all attendees, thereby ensuring that the attendees have a shared understanding of the other attendees' positions in the conference room regardless of whether the attendee is physically attending in-person or remotely attending the meeting. This shared understanding makes it easier for the remote attendees to feel like they are sharing the same space with the in-person attendees, thereby making it easier for the remote attendees to interact with the in-person attendees by, among other benefits, giving all attendees the sense that they are sharing the same space and making it easier for remote attendees to see and, therefore interpret the gestures and body language of the in-person attendees.

In certain aspects, the transition performed at operation 214 may further comprise providing spatialized audio to the attendees in accordance with their perspective view. For example, audio received from another attendee may be modified to simulate the audio originating from the spatial position of the attendee. That is, if the audio originates from an attendee to the right in the perspective view, the audio feed received from that attendee will be modified such that, when the audio is played back, it sounds as if the audio originated to the right of the viewing attendee. In such examples, the audio feeds of the other attendees may be individually altered based upon the perspective view to simulate the audio originating from the spatial position associated with each individual attendee.

For example, FIG. 3C depicts a perspective view 350 of a remote attendee provided by a hybrid conference user interface. The depicted perspective view is a view displayed for remote attendee 1 308, shown in FIG. 3B. As shown in the perspective view 350, remote attendee 2 310 is depicted as sitting to the left of the user, which is consistent with the position selected by remote attendee 2 310 shown in the establishing shot user interface 300 shown in FIG. 3B. Similarly, shared room attendee 1 312 is depicted as sitting directly across the table in the perspective view 350 while shared room attendee 2 314 is depicted across the table to the left between shared room attendees 1 312 and remote attendee 2 310. In doing so, perspective view 350 provides a first person view of the conference room and other conference attendees for remote attendee 1 308 as if remote attendee 1 was actually sitting at her selected position of the conference room table. As previously discussed, unoccupied positions may be displayed as empty, or may be displayed with a graphical indicator, represented by avatar 307. As discussed, the graphical indicator may be selectable during the conference by an attendee. In response, the attendee's position and, if used, spatial audio, will be adjusted according to their new position. Although not shown in the figures, a different perspective view would be depicted for remote attendee 2 310 in which virtual attendee 1 308 is depicted as sitting to the right of virtual attendee 2 312, while shared room attendee 2 314 is depicted directly to the left of shared room attendee 1 312. One of skill in the art will appreciate that the aspects disclosed herein are operable to generate a hybrid conferencing user interface that depicts a unique perspective view for each remote attendee as well as for the shared space attendees attending the hybrid conference, thereby establishing shared sense of space and presence for each remote attendee with both the other remote attendees and the in-person attendees. The perspective view 350 of the hybrid conference interface differs from traditional video conferencing systems in a number of ways. First, in some examples no attendee is presented an image of themselves. Doing so would ruin the immersion effect as people attending a conference in-person are not able to see images of themselves. Additionally, it is common for traditional video conferencing systems to present a mirrored image of the other attendees' video feed. However, the hybrid conferencing system may not present a mirrored video stream, in examples, as doing so would be contrary to established spatial relationship. For example, if a hybrid conference attendee is gesturing towards an attendee on their right, the direction of the gesture is maintained by the hybrid conferencing system user interface, thereby ensuring that the gesture is spatially correct to all attendees, regardless of an individual attendee's position. Thus, a correct spatial relationship is maintained, thereby providing all attendees a view and experience as if they were actually sitting in the same room as the in-person attendees.

FIG. 3D depicts a shared room perspective view 370 of one or more in-person attendees provided by a hybrid conference user interface. For example, the conference room perspective view may be displayed to in-person attendees, such as shared room attendee 1 312 and shared room attendee 2 314. As shown in in the conference room perspective 370, virtual attendee 1 308 is shown sitting directly across the virtual representation of the conference room table. Similarly, virtual attendee 2 310 is shown sitting across the virtual representation of the conference room table to the right of virtual attendee 1 308. As such, the conference room perspective view 370 maintains the spatial arrangement of the hybrid conference attendees based upon the positioning shown in the establishing shot user interface 300 of FIG. 3B for the in-person attendees. In doing so, the remote attendees are presented in a manner that give the shared room attendees the feel that they are in the same room as the shared room attendees, rather than a talking head on a display, as the remote attendees would be depicted using traditional video conferencing tools. In examples, as the in-person attendees are physically seated, there may not be a graphical indicator displayed, such as avatar 307, as the in-person attendee will have no need to select an available virtual position. Alternatively, a graphical indicator of an available position may also be displayed in view 370.

In an instance in which a remote attendee is late to join a hybrid conference, the hybrid conference user interface may have already transitioned from an establishing shot to a perspective view for the other hybrid conference attendees. However, immediately placing the newly added remote attendee in a perspective view presents a number of problems. First, if the newly added remote attendee is immediately placed in a perspective view, the newly added attendee will not have the opportunity to pick a seat in the conference room. This removes an immersive aspect of joining a conference, as, if the remote attendee was joining the conference in-person, the remote attended would have to select an available seat around the conference room table. Second, immediate placement of the newly added remote attendee in a perspective view would not give the attendee the chance to view an establishing shot of the conference. As noted above, the establishing shot is used to give the hybrid conference attendees a shared understanding of a spatial relationship among the attendees. Immediately adding the new remote attendee to a perspective view, thus, would be disorienting to the new remote attendee and further degrade the sense of immersion for the new remote attendee, as if the remote attendee was joining in person she would naturally get a sense of a spatial relationship of the attendees as she entered the conference room and walked to an open position at the table. Alternatively, already participating attendees may be made aware of the newly joining attendee via an animation. For example, an animation of the newly added attending crossing the virtual space to sit in their position may be displayed to the other attendees.

Figure 4:
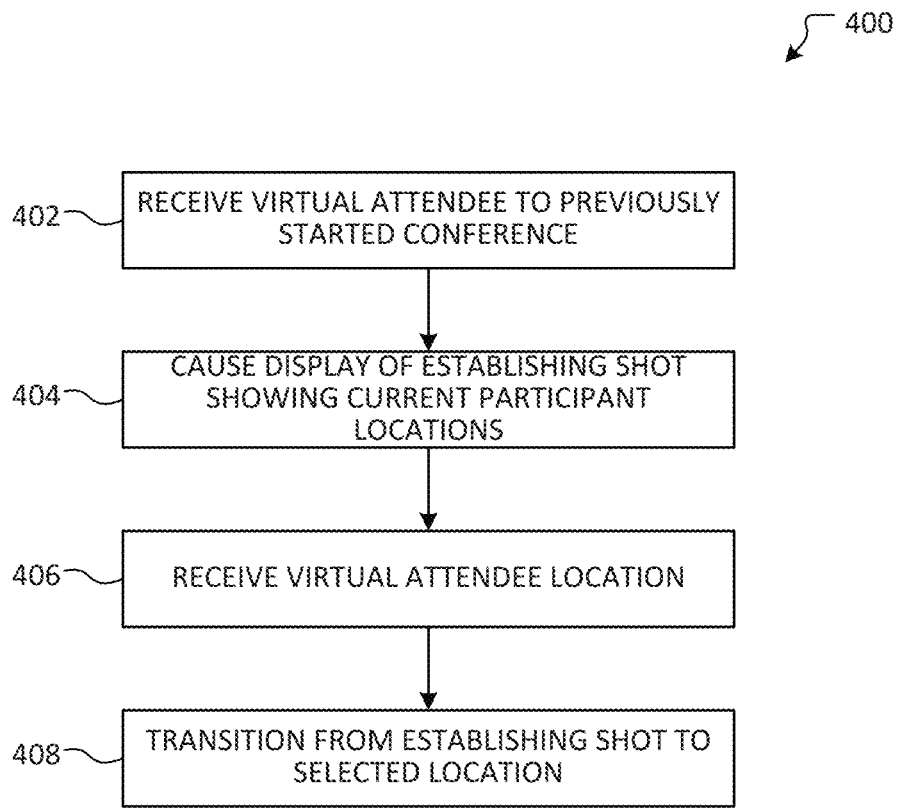
FIG. 4 depicts an exemplary method of adding a remote attendee to a hybrid conference already in progress.

FIG. 4 depicts an exemplary method 400 of adding a remote attendee to a hybrid conference already in-progress. The method 400 may include more or fewer steps or may arrange the order of the steps differently than those shown in FIG. 4. The method 400 can be executed as a set of computer-executable instructions executed by a computer system and encoded or stored on a computer readable medium. Further, the method 400 can be performed by gates or circuits associated with a processor, an ASIC, an FPGA, a SOC or other hardware device. In one example, the method 400 may be performed by a hybrid conference controller, such as hybrid conference controller 114 of FIG. 1. Alternatively, the method 400 may be performed by one of the attendee devices, a host device, or a cloud service platform. Flow begins at operation 402 where the method receives a request to join an in-progress hybrid conference from a virtual attendee. For example, a hybrid conference system may receive an indication that a new attendee is attempting to join the conference. The new attendee may have been previously invited to the hybrid conference but is joining late. Alternatively, the new attendee may be invited to join an already in-progress hybrid conference by one of the attendees. The invitation may be initiated using the hybrid conference interface system. The invitation may be sent to the new attendee via email, instant message, text message, or via a notification in a hybrid conferencing application. The invitation may contain a link or a user interface element that, when selected, connects the new attendee to the hybrid conference.

Flow continues to operation 404, where the new remote attendee is presented an establishing shot of the hybrid conference. In examples, the device performing the method 400 may send an instruction to a hybrid conferencing application on the new remote attendee's device, or an instance of a hybrid conferencing application accessed by the new remote attendee's device, which causes the establishing shot user interface to display, similar to the establishing shot user interface 300 depicted in FIG. 3B. As the hybrid conference is already in progress, the establishing shot user interface displayed to the remote attendee will already show the position of the attendees already participating in the hybrid conference, as well as showing available positions that may be selected by the new remote attendee.

At operation 406, a selection of an available position is received. The process for receiving the selection may be performed similar to the selection process described with respect to FIG. 2. Alternatively, if there is only one available position left, the new remote attendee may automatically be placed in the available position. Even if the new remote attendee is automatically placed in the position, the new attendee will still be shown an indication of their location in the establishing shot, thereby ensuring that the new remote attendee is still able to understand her spatial relationship to the other hybrid attendees. At operation 408, the hybrid conference user interface transitions the new remote attendee from the establishing shot to a perspective view.

The transition may be performed as discussed above with respect to FIGS. 2 and 3C. In examples, the transition may occur upon receipt of a selection to join the hybrid conference from the new remote attendee. Alternatively, the transition may be performed automatically after a predetermined amount of time has passed after placement of the new remote attendee in her position in the establishing shot shown in the establishing shot user interface of the hybrid conferencing application. The predetermined amount of time should be long enough for the new remote attendee to obtain a mental understanding of her spatial relationship to the other hybrid conference attendees.

Figure 5:
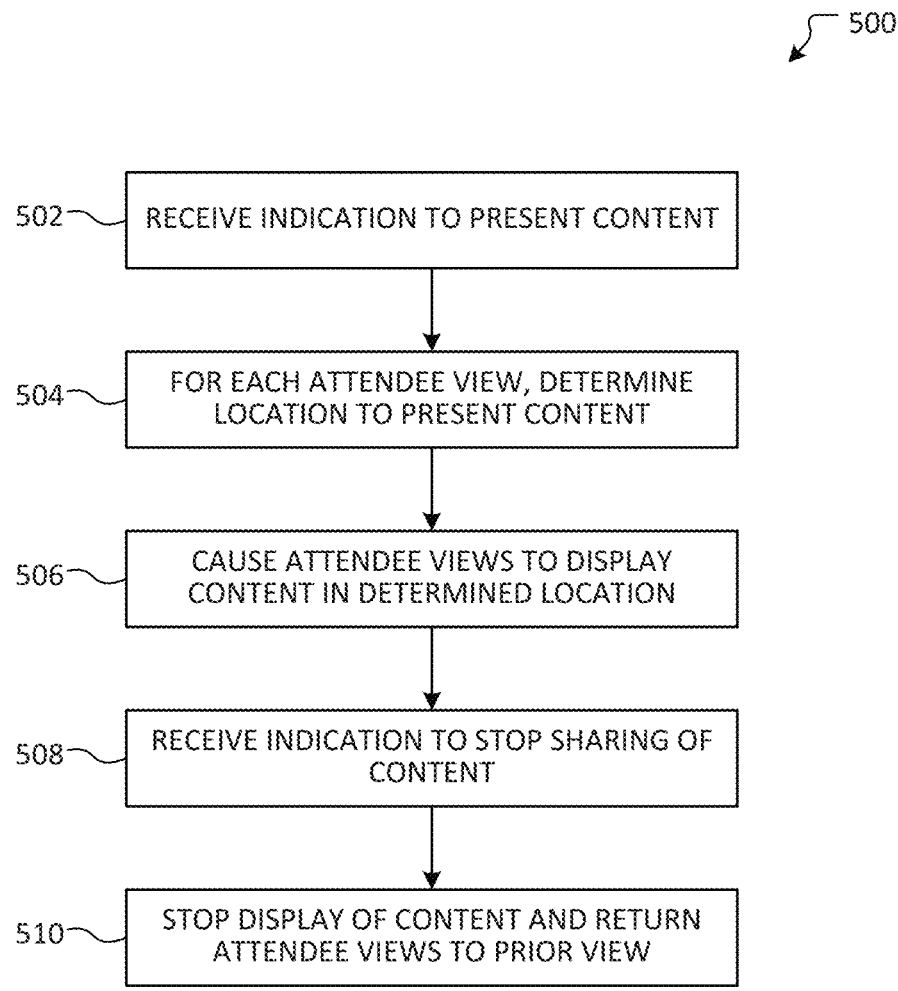
FIG. 5 depicts an exemplary method for presenting content in a hybrid conferencing user interface.

It is common for shared content media (e.g., screen sharing) to be presented during a video conference. Traditional video conference systems present the media in a full screen view or nearly full screen view, in which case the images of the conference attendees are shrunk and moved to the side, below, or on top of the presented media. However, such a presentation of media by a hybrid conferencing system would negatively affect the immersion by disrupting the spatial relationship presented in the establishing shot during the admittance process and maintained in an attendee's perspective view. FIG. 5 depicts an exemplary method 500 for presenting content in a hybrid conferencing user interface. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. In one example, the method 500 may be performed by a hybrid conference controller, such as hybrid conference controller 114 of FIG. 1. Alternatively, the method 500 may be performed by one of the attendee devices, a host device, or a cloud service platform.

Figure 3E:
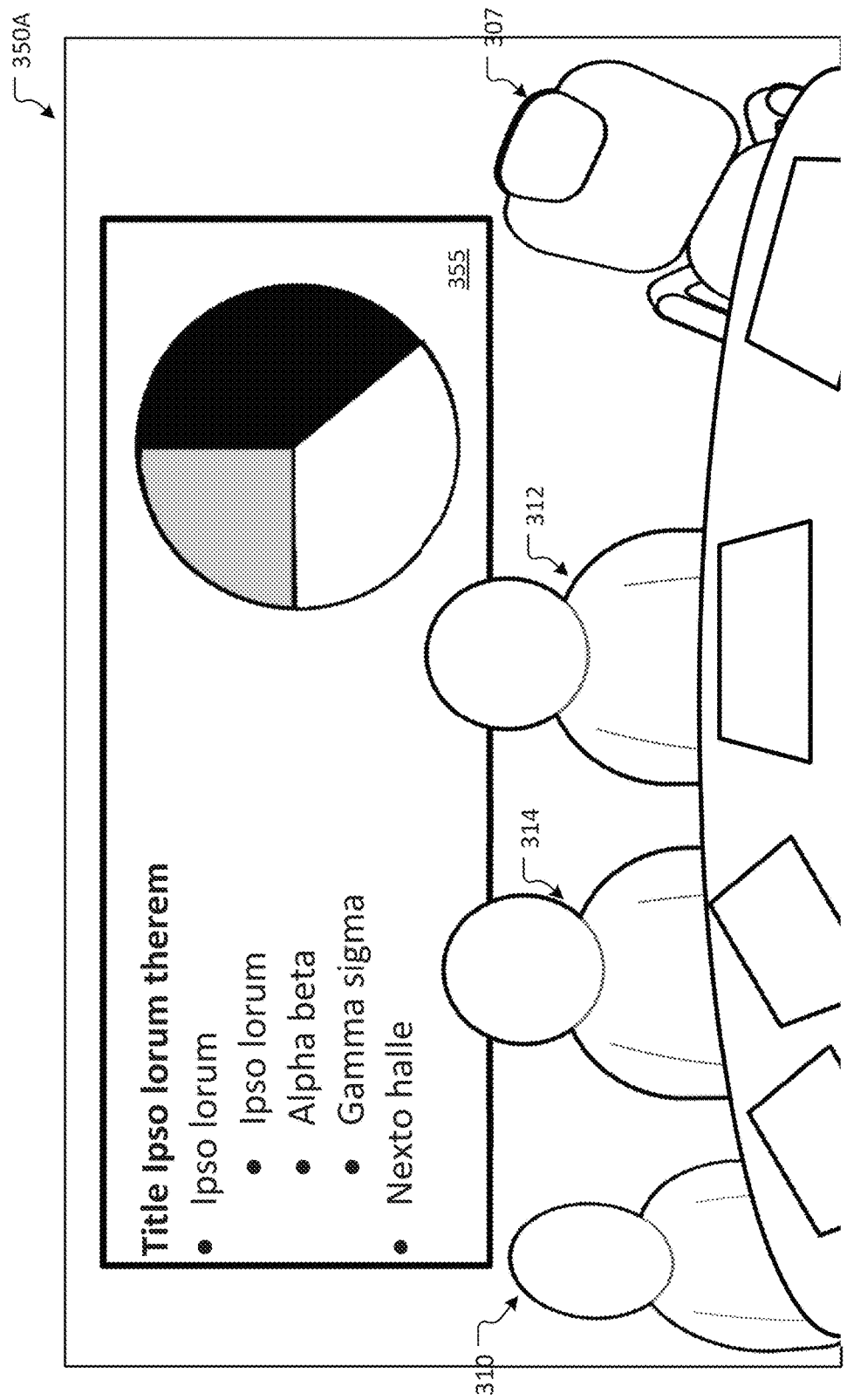
FIG. 3E depicts an exemplary hybrid user interface displaying content from the view of a remote attendee.
Figure 3F:
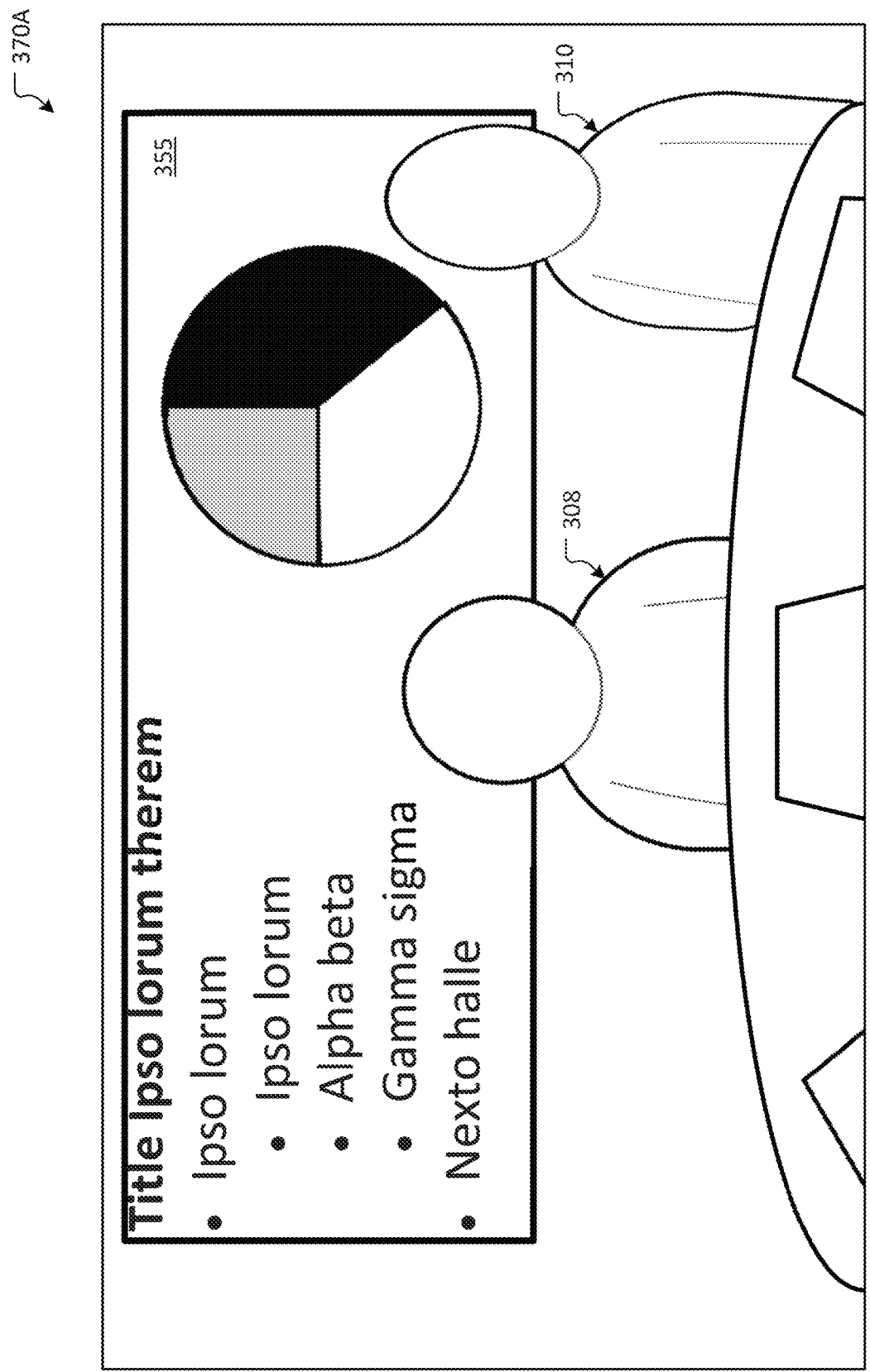
FIG. 3F depicts an exemplary user interface displaying content from the view of an in-person attendee.

Flow begins at operation 502, where the method receives an indication that content is to be presented. In examples, the shared content can be a document, a slide deck, a presentation, a video, a hybrid conference attendee's screen, or any other type of content. Upon receiving the indication to present the content, flow continues to operation 504 where a determination is made as to where the content should be displayed in the hybrid conferencing user interface. As discussed, the hybrid conferencing interface maintains a spatially correct perspective view for each hybrid conference attendee (or attendees when presenting to the in-person attendees). As such, the hybrid conferencing system will determine a correct placement of the content presentation for each perspective of attendees in the hybrid conference. In one example, a hybrid controller may determine the placement that is common for every hybrid attendee's perspective view. Alternatively, a hybrid conferencing application on an attendee's client device, or on a shared physical space device, may individually determine a placement position for the content. The determination may be made by analyzing an attendee's view to determine whether there is enough space to display the shared content. If it is determined that there not enough space in the attendee's view, a determination may be made as to how the attendee's view should be adjusted to make space or the shared content. The adjustment may be in the form of repositioning the visible attendees, by moving them down, for example, to create space above the virtual attendees. Alternatively, or additionally, a determination may be made to overlap the visible attendees over the shared content. The determination may take into account the type of content when determining whether an overlap is appropriate or not. At operation 506, the content is displayed in the determined location for each perspective view for the different hybrid conference attendees. For example, FIG. 3E depicts an exemplary hybrid user interface 350A displaying content. In the depicted example interface 350A is presented from the perspective of remote attendee 1 308, shown in FIG. 3C. As shown in the perspective view 350A, remote attendee 2 310 is depicted as sitting to the left of the remote attendee 1 308, which is consistent with the position selected by remote attendee 2 310 shown in the establishing shot user interface 300 shown in FIG. 3B. Similarly, shared room attendee 1 312 is depicted as sitting directly across the table in the perspective view 350A while shared room attendee 2 314 is depicted across the table to the left, positioned between remote attendee 2 310 and shared room attendee 1 312. Perspective view 350A differs from perspective view 350 (FIG. 3C) by positioning the view of the remote attendees lower on the display, thereby providing extra room to display the shared content 355 over the heads of the other hybrid conference attendees. This maintains the immersion effect for remote attendee 1 by creating the appearance that the content is displayed on a screen located above and behind the other attendees, as would be the case with a television mounted on a wall in the conference room. As such, the content 355 is viewable in a manner that maintains both the remote attendee's perspective view and the spatial relationship among the hybrid conference attendees. FIG. 3F depicts an exemplary user interface 370A displaying content from the view of an in-person attendee. As shown in FIG. 3F, the shared virtual content 355 is depicted above and behind virtual attendees 308 and 310. Although not shown in the figures, a similar display would be generated for the other remote hybrid conference attendees, however, the placement of the other attendees would be modified to maintain a correct spatial relationship for each attendee. At operation 510, upon receiving an indication to stop presentation of the content, the content is removed from the display and the hybrid conferencing system transitions back to the original perspective view for each attendee.

Figure 6:
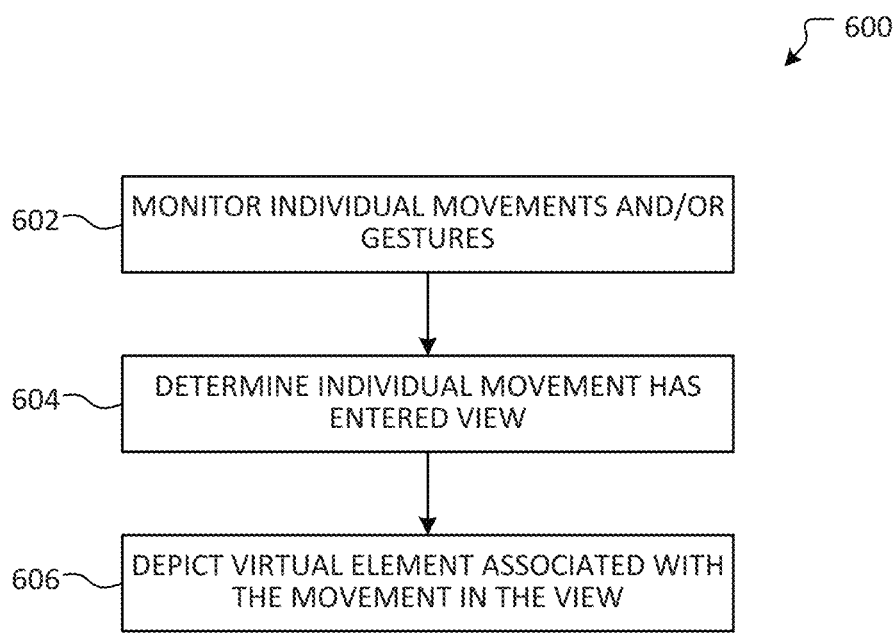
FIG. 6 depicts an exemplary method for presenting a virtual element representing movement of a hybrid conferencing attendee in the hybrid conferencing user interface.

In examples, it may be helpful, particularly for in-person attendees but also for remote attendees, to depict a representation of movement on the hybrid conferencing user interface in order to help an attendee maintain a mental mapping of the spatial relationship among attendees. FIG. 6 depicts an exemplary method 600 for presenting a virtual element representing movement of a hybrid conferencing attendee in the hybrid conferencing user interface. FIG. 6 depicts an exemplary method 600 for presenting content in a hybrid conferencing user interface. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. In one example, the method 600 may be performed by a hybrid conference controller, such as hybrid conference controller 114 of FIG. 1. Alternatively, the method 600 may be performed by one of the attendee devices, a host device, or a cloud service platform.

Flow begins at operation 602, wherein the method monitors the movement of one or more hybrid conference attendees. In examples, motion tracking tool and/or image recognition software may analyze the video feed of a hybrid conference attendee to track the attendee's movements. The image recognition software may be used to both identify a particular attendee and identify specific body parts of the attendee, for example, the attendee's hand. As the movement is being tracked, flow continues to operation 604 where a determination is made as to whether the attendee's movement has entered the attendee's field of view. In examples, the determination is based upon the perspective view displayed in the attendee's hybrid conference user interface. When it is determined that the movement has entered the field of view, a virtual element is generated and displayed in the perspective view presented to the tracked attendee. For example, if an attendee is making a pointing gesture with their hand, the method determines that their hand has entered a viewshed of the perspective view displayed in the hybrid conference user interface, and generates a digital representation of the hand at the position in the user interface. In some examples, the virtual element may be a virtual representation of the moving body part, as identified using image recognition software. Alternatively, other types of graphical elements may be displayed, such as an arrow, a user avatar, or the like.

Figure 3G:
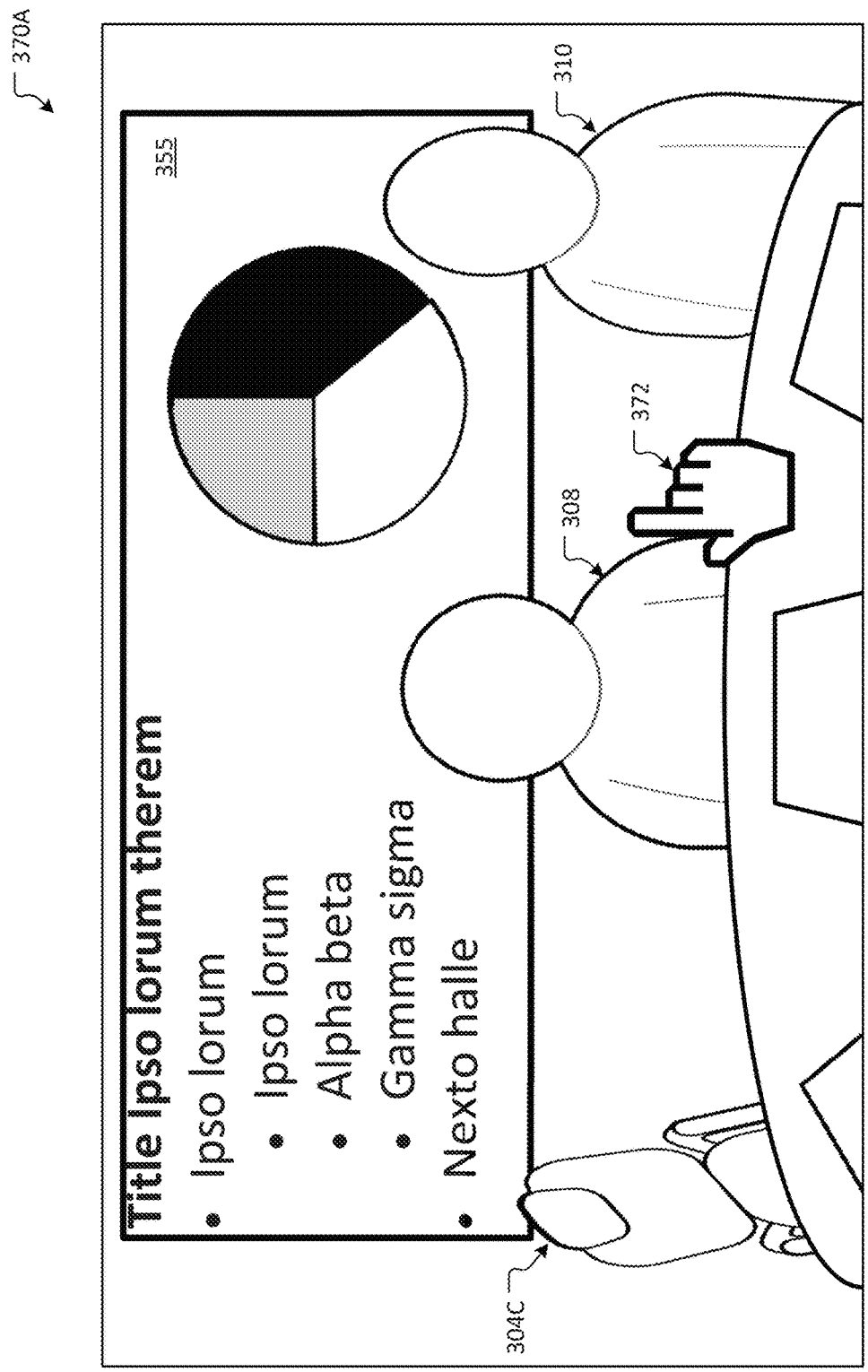
FIG. 3G depicts an exemplary hybrid conference user interface for displaying a virtual element corresponding to an attendee's movement.

Continuing with the above example, FIG. 3G depicts an exemplary hybrid conference user interface 370A for displaying a virtual element corresponding to an attendee's movement. In the depicted example, the hybrid conference interface 370 is displayed from the perspective of an in-person attendee, such as the perspective displayed in FIG. 3D, however, adjusted to display content 355, as described above. In the depicted example, the hybrid conferencing system depicts a virtual element 372 representing the movement of an in-person attendee's hand moving into the viewshed of the perspective view of the shared room attendees. In the depicted example, the virtual element 372 represents the tracked body part, e.g., a hand, however, as described above other types of graphical elements may be depicted without departing from the scope of this disclosure.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, described herein.

Figure 7:
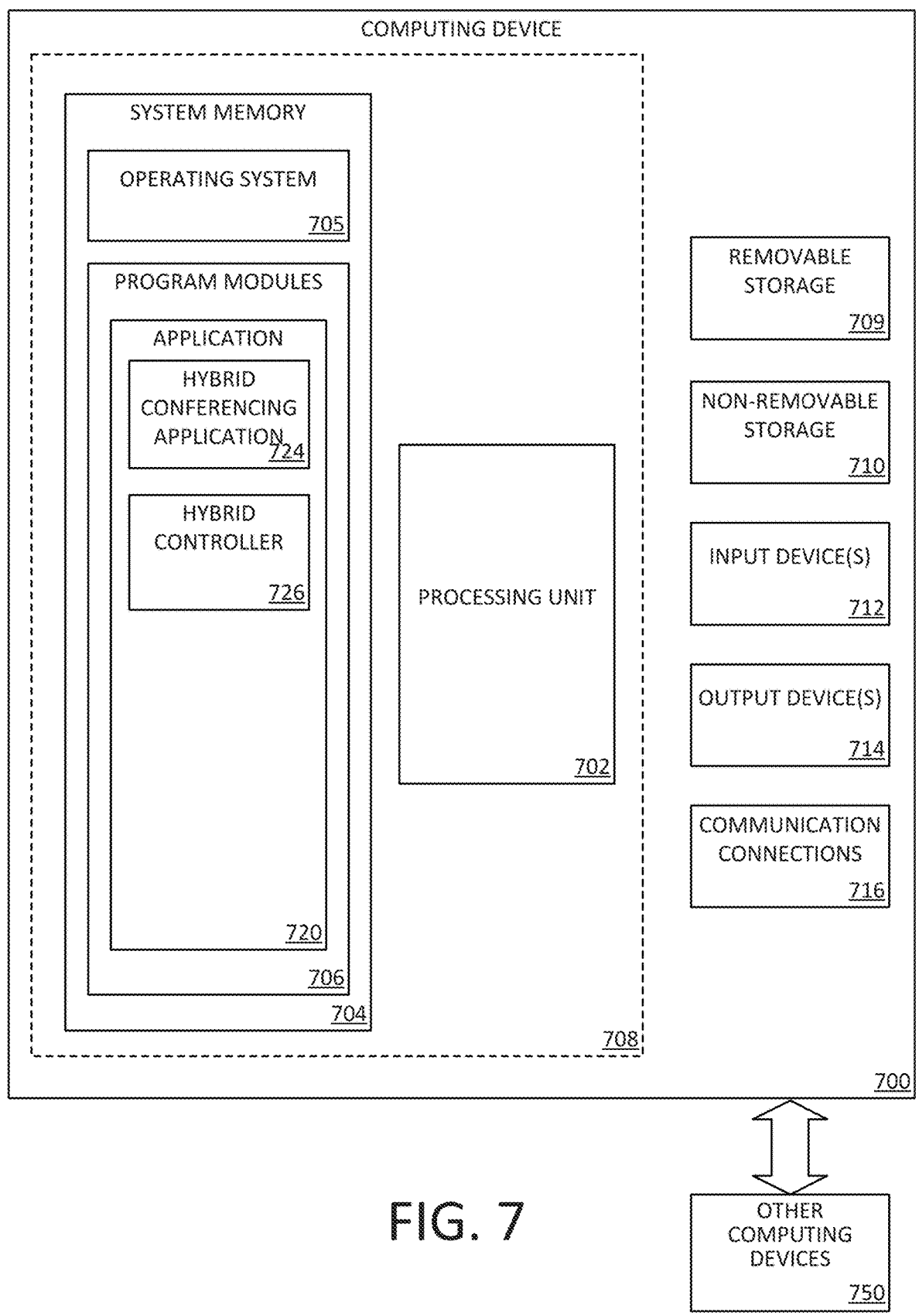
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for running software application 720, such as one or more components supported by the systems described herein. As examples, system memory 704 may store comment hybrid conferencing app 724 and hybrid UX conferencing controller 726. The operating system 705, for example, may be suitable for controlling the operation of the computing device 700.

Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., application 720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
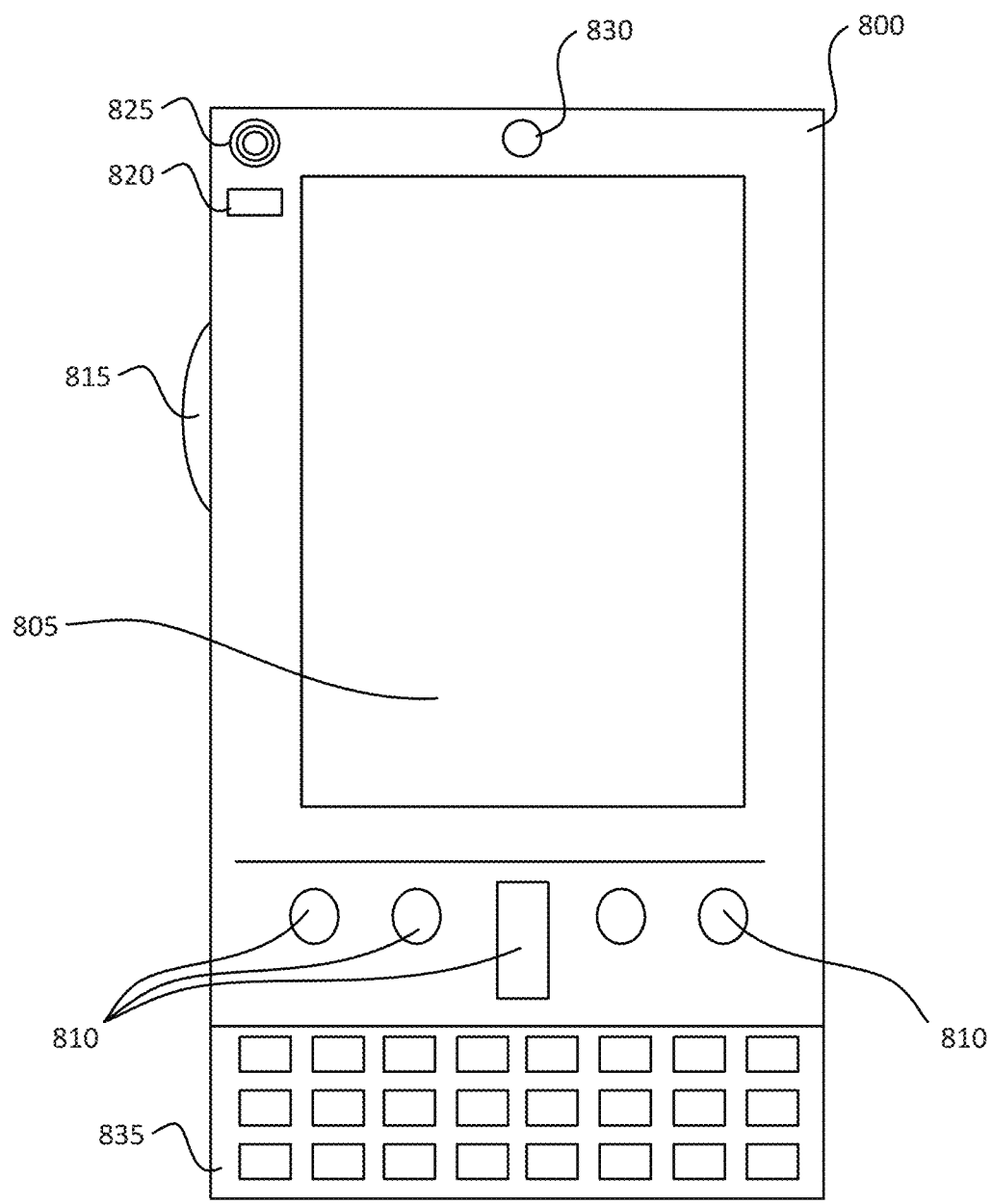
FIGS. 8A and 8B are simplified block diagrams of a mobile computing device with which aspects of the present disclosure may be practiced.
Figure 8B:
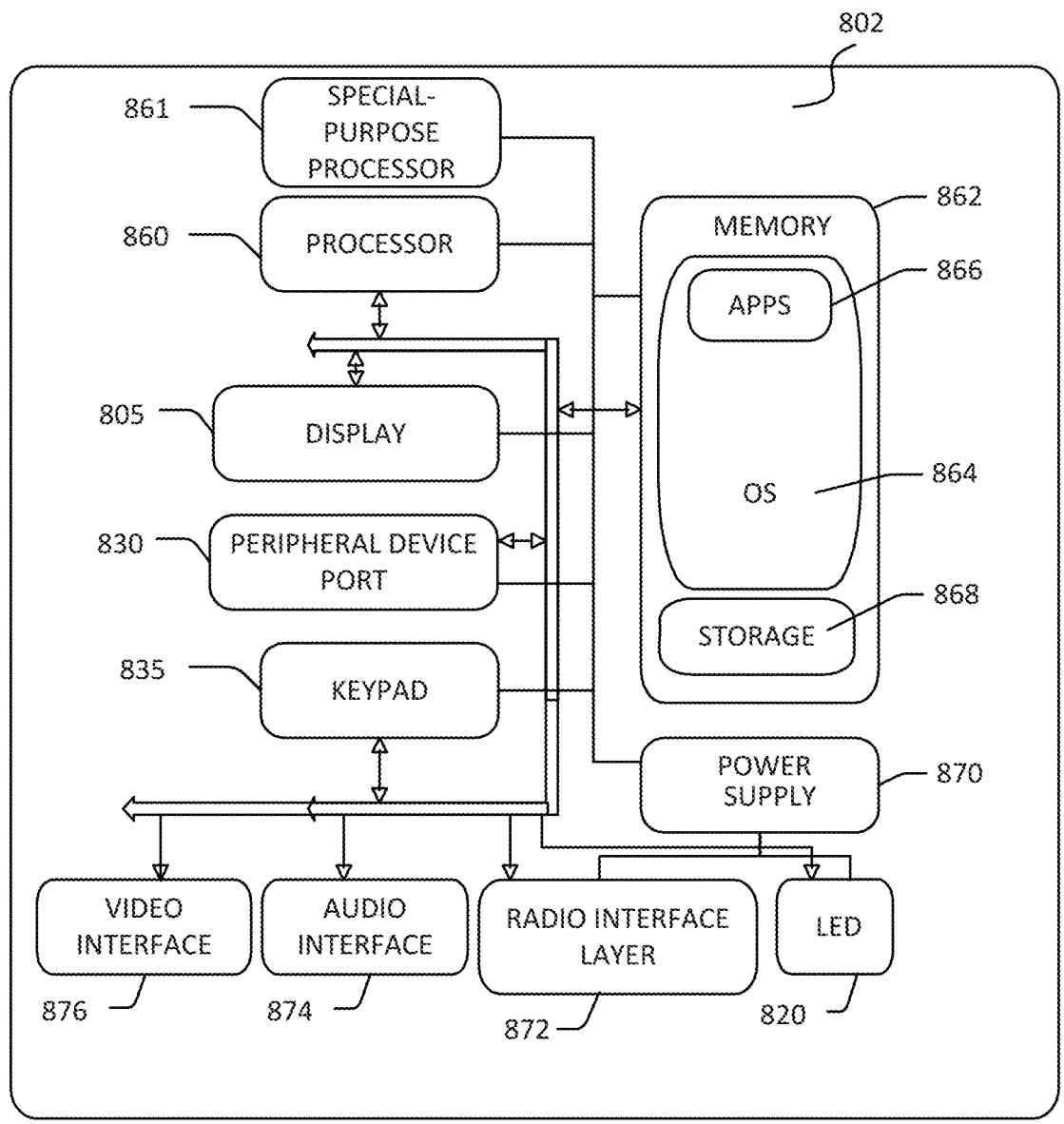

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, elements. The mobile computing device 800 typically includes a display 805 and one or more input buttons 810 that allow the user to enter information into the mobile computing device 800. The display 805 of the mobile computing device 800 may also function as an input device (e.g., a touch screen display).

If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments.

In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display.

In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g., search engine, extractor module, relevancy ranking module, answer scoring module, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
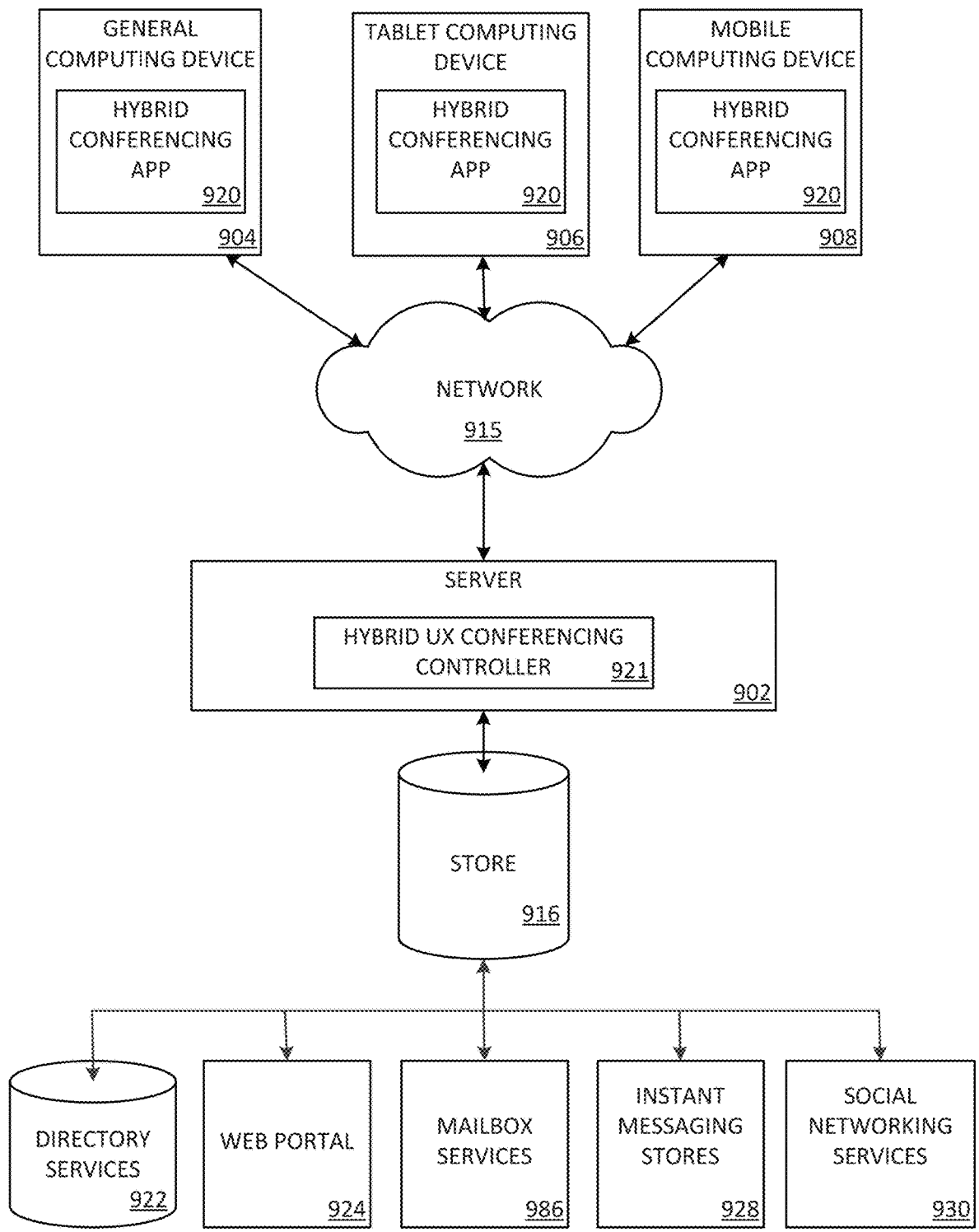
FIG. 9 is a simplified block diagram of a distributed computing system in which aspects of the present disclosure may be practiced.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930.

A hybrid conferencing app 920 may be employed by a client that communicates with server device 902, and/or hybrid UX conferencing controller 921 (e.g., performing aspects described herein) may be employed by server device 902. The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general concept embodied in this application that do not depart from the broader scope of the claimed disclosure.

What is claimed is:

1. A method for providing a hybrid conference user interface, the method comprising:
    generating, as part of the hybrid conference user interface and prior to start of the hybrid conference, an establishing shot, wherein the establishing shot comprises a virtual representation of a meeting space and placement of a first remote attendee in a spatial arrangement, and wherein the establishing shot further comprises a plurality of available positions in the spatial arrangement that each have an associated graphical indicator to indicate the respective available position is selectable;
    determining a position within the meeting space corresponding with an in-person attendee of the hybrid conference, wherein the position is determined based on a user selection of a first available position from the plurality of available positions displayed in the establishing shot;
    displaying, in the establishing shot, an indication that the position is occupied by the attendee of the virtual representation of the meeting space; and
    providing, for display to a first remote attendee, a transition from the establishing shot to a perspective position for the first remote attendee, wherein the spatial arrangement among attendees is maintained during the hybrid conference and the spatial arrangement of the in-person attendee relative to the first remote attendee is simulated by a spatial audio source.

2. The method of claim 1, wherein the establishing shot is determined based upon a style template associated with the physical location.

3. The method of claim 1, wherein the style template is determined dynamically based upon a camera feed of the conference room, wherein dynamically determining the style template comprises:
    analyzing, using a machine learning model, the camera feed to determine one or more objects in the physical representation; and
    generating a digital representation of the one or more objects.

4. The method of claim 1, wherein the first available position is selected from a subset of available positions, the subset of available positions comprising a graphical indicator that the subset of available positions are selectable by one or more remote users.

5. The method of claim 1, further comprising receiving an indication that a second remote attendee is joining the hybrid conference, wherein the second remote attendee is joining after the hybrid conference started.

6. The method of claim 5, further comprising:
    in response to receiving the indication that the second remote attendee is joining the hybrid conference, displaying a current establishing shot of the hybrid conference;

receiving a selection of the position for the second remote attendee;

causing transition of the current establishing shot to a third perspective view, the third perspective view determined based upon the position; and providing an indication of the addition of the second remote attendee to the first remote attendee and the in-person attendee.

7. The method of claim 6, wherein the current establishing shot displays the position of the second remote attendee and the in-person attendee.

8. The method of claim 1, further comprising:
receiving an indication to present shared content;
determining, for the remote attendee, a location to present the content, wherein the determination is based upon the first perspective view;
adjusting the first perspective view to display the content in the location.

9. The method of claim 8, wherein adjusting the first perspective view comprises displaying the content above the in-person attendee depicted in the first perspective.

10. The method of claim 1, further comprising:
tracking movement of the in-person attendee using an object detection algorithm; and
in response to determining the movement of the in-person attendee has entered a viewshed of the second perspective, causing display of a virtual element associated with the movement in second perspective view.

11. The method of claim 1, wherein, if there is only one available position left, a new remote attendee is automatically placed in the available position.

12. The method of claim 11, wherein if the new remote attendee is automatically be placed in the available position, the new attendee is shown an indication of the location in the establishing shot, thereby indicating, to the new attendee, a relative spatial relationship respective to the other hybrid attendees.

13. The method of claim 12, wherein the new remote attendee is transitioned from the establishing shot to a perspective view after a predetermined amount of time has passed.

14. The method of claim 13, wherein the predetermined amount of time further comprising a time in which the new remote attendee obtains and understands the spatial relationship to the other hybrid attendees.

15. A system comprising:
at least one processor; and
memory encoding computer executable content that, when executed by the at least one processor, performs a method comprising:
displaying, prior to start of a hybrid conference, an establishing shot as part of a conference user interface, wherein the establishing shot comprises a virtual representation of a meeting space for a conference and placement of a first remote attendee in a special arrangement;
determining a first position with the meeting space corresponding with an in-person attendee of the hybrid conference;
displaying a first attendee at the first position in the establishing shot;
in response to receiving an indication that a second attendee has joined the conference, displaying the second attendee at a second position in the establishing shot, wherein the establishing shot further comprises a plurality of available positions in the spatial arrangement that each have an associated graphical indicator to indicate the respective available position is selectable; and in response to receiving an indication to begin the conference, transitioning the from the establishing shot to a perspective view, the perspective view based upon the first position, such that the second attendee is displayed in a spatially correct position relative to the first attendee, wherein receiving a selection of the first position comprises receiving a selection of an indication of a first available position from the first attendee and receiving a selection of the second position comprises receiving a selection of an indication of a second available position from the second attendee the spatially correct position is based upon the first position and the second position, the spatial arrangement among attendees is maintained during the hybrid conference, and the spatial arrangement of the in-person attendee relative to the first remote attendee is simulated by a spatial audio source.

16. The system of claim 15, wherein transitioning to the perspective view further comprises:
receiving an audio feed from the second attendee;
modifying the audio feed based upon the second position relative to the first position to generate spatialized audio; and
causing playback or the spatialized audio.

17. The system of claim 15, wherein the first available position is selected from a subset of available positions, the subset of available positions comprising a graphical indicator that the subset of available positions are selectable by one or more remote users.

18. The system of claim 15, wherein the method further comprises:
in response to receiving an indication that a new attendee is joining the hybrid conference, providing an indication that the new attendee joined the conference, wherein the indication comprises at least one of:
an animation depicting entry of the new attendee to the conference; or
an audio indication.

19. A computer storage medium encoding computer executable instructions that, when executed by at least one processor, perform a method comprising:
generating, as part of the conference user interface and prior to start of the hybrid conference, an establishing shot, wherein the establishing shot comprises a virtual representation of a meeting space and placement of a first remote attendee in a spatial arrangement, and wherein the establishing shot further comprises a plurality of available positions in the spatial arrangement that each have an associated graphical indicator to indicate the respective available position is selectable;
determining a first position within the meeting space corresponding with an in-person attendee of the hybrid conference, wherein the first position is determined based on a user selection of a first available position from a plurality of available positions around a reference object;
displaying, in the establishing shot, an indication that the first position is occupied by the attendee of the virtual representation of the meeting space; and
determining, based upon data received from a device, that a second attendee has joined the conference, wherein the determining comprises one of:
when the second attendee is an in-person attendee, determining, based upon an input received from the device, that the second attendee is sitting in a physical location of the meeting space; or when the second attendee is a second remote attendee, receiving a selection of the second position from the device;

providing, for display to a remote attendee, a transition from the establishing shot to a perspective position for the first remote attendee, wherein the spatial arrangement among attendees is maintained during the hybrid conference and the spatial arrangement of the in-person attendee relative to the first remote attendee is simulated by a spatial audio source.

20. The computer storage medium of claim 19, wherein the method further comprises:

tracking movement of the in-person attendee; and in response to determining the movement of the in-person attendee has entered a viewshed of the second perspective, causing display of a virtual element associated with the movement in second perspective view.

* * * * *